United States Patent
Kucharewski et al.

(10) Patent No.: US 12,279,250 B2
(45) Date of Patent: Apr. 15, 2025

(54) NETWORK TIME SECTORING

(71) Applicant: QUALCOMM Incorporated, San Diego, CA (US)

(72) Inventors: Nicholas Kucharewski, San Jose, CA (US); Ahmed Ragab Elsherif, San Jose, CA (US); Simon Jan Brand, Pleasanton, CA (US); Srinivas Katar, Fremont, CA (US); Xiaolong Huang, San Jose, CA (US); Sandip Homchaudhuri, San Jose, CA (US); Harinder Singh, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 445 days.

(21) Appl. No.: 17/722,641

(22) Filed: Apr. 18, 2022

(65) Prior Publication Data

US 2023/0337217 A1   Oct. 19, 2023

(51) Int. Cl.
*H04L 12/00* (2006.01)
*H04B 7/0452* (2017.01)
(Continued)

(52) U.S. Cl.
CPC ...... *H04W 72/1263* (2013.01); *H04B 7/0452* (2013.01); *H04B 7/0491* (2013.01); *H04W 72/0446* (2013.01); *H04W 72/543* (2023.01)

(58) Field of Classification Search
CPC ......... H04W 72/1263; H04W 72/0446; H04W 72/543; H04W 28/0273; H04W 84/12;
(Continued)

(56) References Cited

U.S. PATENT DOCUMENTS

| 7,383,049 B2 * | 6/2008 | Deloach, Jr. | G01S 19/14 342/357.29 |
| 11,101,903 B2 * | 8/2021 | Yun | H04W 4/021 |

(Continued)

OTHER PUBLICATIONS

Cavalcanti D (Intel Corporation)., et al., "Enhancements for QoS and Low Latency in 802.11be R1", 11-20-1350-00-00BE-ENHANCEMENTS-FOR-QOS-AND-LOW-LATENCY-IN-802-11BE-R1, IEEE-SA Mentor, Piscataway, NJ, USA, vol. 802.11 EHT, 802.11be, Aug. 28, 2020, pp. 1-17, XP068172364, Slide 5-Slide 7.

(Continued)

*Primary Examiner* — Frantz Coby
(74) *Attorney, Agent, or Firm* — Kevin M. Donnelly; Holland & Hart LLP

(57) ABSTRACT

This disclosure provides methods, devices and systems for provisioning resources for wireless communications. Some implementations more specifically relate to provisioning such resources based on a mapping of wireless communication devices to a number of time sectors that occur periodically and do not overlap other time sectors. In some aspects, each wireless stations (STAs) in a basic service set (BSS) may be mapped to a respective time sector based on attributes associated with the BSS so that communications between a STA and its associated access point (AP) can only occur within the respective time sector(s) to which the STA is mapped. In some other aspects, each AP in a multi-AP environment may be mapped to a respective time sector based on attributes associated with the multi-AP environment so that communications between an AP and its associated STAs can only occur within the respective time sector(s) to which the AP is mapped.

30 Claims, 19 Drawing Sheets

(51) Int. Cl.
*H04B 7/0491* (2017.01)
*H04W 72/0446* (2023.01)
*H04W 72/1263* (2023.01)
*H04W 72/543* (2023.01)

(58) Field of Classification Search
CPC .................. H04W 74/02; H04W 74/0808; H04B 7/0452; H04B 7/0491
USPC .......................................... 370/311, 329, 336
See application file for complete search history.

(56) References Cited

U.S. PATENT DOCUMENTS

| | | | | |
|---|---|---|---|---|
| 2014/0177605 | A1* | 6/2014 | Kwon | H04W 72/23 370/336 |
| 2015/0173012 | A1* | 6/2015 | Seok | H04W 84/12 370/311 |
| 2019/0296804 | A1* | 9/2019 | Eitan | H04W 72/0446 |
| 2020/0145072 | A1* | 5/2020 | Dash | H04B 7/0617 |
| 2020/0228176 | A1* | 7/2020 | Bareket | H04B 7/0626 |
| 2020/0374933 | A1* | 11/2020 | Lou | H04W 74/006 |

OTHER PUBLICATIONS

International Search Report and Written Opinion—PCT/US2023/017253—ISA/EPO—Jul. 7, 2023 (2201724WO).

Kiran M.P.R.S., et al., "Short-Term Memory Based Online Learning Framework for Intelligent Sector Selection in IEEE 802 .11 ad", 2020 IEEE Sensors Applications Symposium (SAS), Mar. 9, 2020, 6 Pages, XP033840753, p. 1, Left-Hand Column, Last Line—Right-Hand Column, Line 5, figure 1.

Nezou P (Canon)., et al., "Low-Latency Triggered TWT", 11-20-1843-02-00BE-LOW-LATENCY-TRIGGERED-TWT, IEEE-SA Mentor, Piscataway, NJ, USA, vol. 802.11 EHT, 802.11be, No. 2, Dec. 17, 2020, pp. 1-14, XP068175533, pp. 2-5, Slides 3-8.

Nurchis M., et al., "Target Wake Time: Scheduled Access in IEEE 802.11ax WLANs", arxiv.org, Cornell University Library, 201 Olin Library Cornell University Ithaca, NY 14853, Apr. 20, 2018, XP080872859, pp. 1-13, Section 3.2, Section 4.1, Section 4.4, Figure 4.

* cited by examiner

NETWORK TIME SECTORING

TECHNICAL FIELD

This disclosure relates generally to wireless communication, and more specifically, to managing wireless communications in a network according to time sectors.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

An AP provisions or otherwise allocates resources to its associated STAs for communications in a WLAN. Example resources may include time, frequency, memory, or processing resources, among other examples. Some APs rely on feedback from the network to determine resource allocations that balance the capabilities, requirements, and channel conditions of their associated STAs. For example, an AP may adjust a modulation and coding scheme (MCS) used for data transmissions to a particular STA until a packet error rate (PER) associated with the transmissions settles a desired PER (at which point the MCS will have converged to a data rate that is optimized for the desired PER). The process by which an AP controls or adjusts an allocation of resources based on feedback from the network can be referred to as a "control loop." As wireless networks continue to grow, and wireless technologies continue to evolve, new mechanisms are needed to ensure that various control loops can converge on resource allocations that are optimized for communications between the wireless communication devices in a given network.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. The method may be performed by a wireless communication device, and may include receiving network information indicating one or more attributes associated with a basic service set (BSS) that includes a plurality of wireless stations (STAs); mapping the plurality of STAs to a number (N) of time sectors based on the received network information so that at least one STA of the plurality of STAs is mapped to each of the N time sectors and each STA of the plurality of STAs is mapped to one or more of the N time sectors, where each of the N time sectors represents a respective interval of time that occurs periodically and does not overlap any of the remaining N−1 time sectors; and provisioning resources for communications with each STA of the plurality of STAs so that any communications with the STA occur within the respective one or more time sectors to which it is mapped and not outside the respective one or more time sectors.

In some implementations, the resources may include time, frequency, multi-user streams, memory, buffer, or processing resources. In some implementations, N may be based on the one or more attributes or a number (M) of STAs associated with the BSS. In some implementations, each of one or more of the N time sectors may be associated with a respective multi-user (MU) multiple-input multiple-output (MIMO) group that consists of multiple STAs, of the plurality of STAs, mapped to the respective time sector. In some implementations, each STA of the plurality of STAs may be mapped to exactly one of the N time sectors.

In some implementations, the provisioning of the resources may include transmitting, within each of the N time sectors, a respective trigger frame that solicits concurrent uplink (UL) transmissions from each of the STAs, of the plurality of STAs, mapped to the time sector. In some other implementations, the provisioning of resources may include provisioning, for each of the N time sectors, a respective restricted target-wake-time (r-TWT) service period (SP) that overlaps the time sector and is associated with each of the STAs, of the plurality of STAs, mapped to the time sector. Still further, in some implementations, the provisioning of resources may include transmitting a beacon frame carrying a traffic indication map (TIM) that indicates an availability of downlink (DL) data for each of the STAs, of the plurality of STAs, mapped to one or more time sectors of the N time sectors, where the one or more time sectors overlap a beacon interval associated with the beacon frame.

In some aspects, the one or more attributes may include a direction of communications with each STA of the plurality of STAs. In such aspects, the mapping of the plurality of STAs to the N time sectors may include mapping one or more first STAs of the plurality of STAs to a first time sector of the N time sectors based on the network information indicating that the direction of communications with each of the one or more first STAs is a DL direction; and mapping one or more second STAs of the plurality of STAs to a second time sector of the N time sectors based on the network information indicating that the direction of communications with each of the one or more second STAs is an UL direction.

In some aspects the one or more attributes may include a volume of data traffic communicated with each STA of the plurality of STAs. In such aspects, the mapping of the plurality of STAs to the N time sectors may include mapping one or more first STAs of the plurality of STAs to a first time sector of the N time sectors based on the network information indicating that the volume of data traffic communicated with each of the one or more first STAs is greater than a threshold amount; and mapping one or more second STAs of the plurality of STAs to a second time sector of the N time sectors based on the network information indicating that the volume of data traffic communicated with each of the one or more second STAs is less than the threshold amount.

In some aspects, the one or more attributes may include one or more capabilities supported by each STA of the plurality of STAs. In such aspects, the mapping of the plurality of STAs to the N time sectors may include mapping one or more STAs of the plurality of STAs to a first time sector of the N time sectors based on the network information indicating that each of the one or more STAs supports the same one or more capabilities.

In some aspects, the one or more attributes may include one or more physical layer (PHY) modes supported by each STA of the plurality of STAs. In such aspects, the mapping of the plurality of STAs to the N time sectors may include mapping one or more STAs of the plurality of STAs to a first time sector of the N time sectors based on the network information indicating that each of the one or more STAs supports the same one or more PHY modes.

In some aspects, the one or more attributes may include a quality of service (QoS) requirement associated with multi-hop communications with any STA of the plurality of STAs. In such aspects, the mapping of the plurality of STAs to the N time sectors may include mapping a first STA of the plurality of STAs to a first time sector of the N time sectors based on the network information indicating that the QoS requirement associated with multi-hop communications with the first STA is greater than a threshold QoS requirement.

In some aspects, the one or more attributes may include one or more network topology characteristics associated with each STA of the plurality of STAs. In such aspects, the mapping of the plurality of STAs to the N time sectors may include mapping one or more STAs of the plurality of STAs to a first time sector of the N time sectors based on the network information indicating that the one or more network topology characteristics associated with each of the one or more STAs are within a threshold range. In some implementations, the one or more network topology characteristics may include an orientation, location, or path loss.

In some aspects, the one or more attributes may include one or more channel characteristics associated with each STA of the plurality of STAs. In such aspects, the mapping of the plurality of STAs to the N time sectors may include mapping one or more STAs of the plurality of STAs to a first time sector of the N time sectors based on the network information indicating that the one or more channel characteristics associated with each of the one or more STAs are within a threshold range. In some implementations, the one or more channel characteristics may include a channel correlation metric, Doppler shift, or delay spread.

In some aspects, the one or more attributes may include one or more service-level agreement (SLA) requirements associated with each STA of the plurality of STAs. In such aspects, the mapping of the plurality of STAs to the N time sectors may include mapping one or more STAs of the plurality of STAs to one or more time sectors of the N time sectors based on the network information indicating that the one or more SLA requirements associated with each of the one or more STAs are within a threshold range. In some implementations, a frequency with which each of the one or more time sectors periodically occurs may be based on the one or more SLA requirements associated with the one or more STAs.

Another innovative aspect of the subject matter described in this disclosure can be implemented in a wireless communication device. In some implementations, the wireless communication device may include at least one processor and at least one memory communicatively coupled with the at least one processor and storing processor-readable code. In some implementations, execution of the processor-readable code by the at least one processor causes the wireless communication device to perform operations including receiving network information indicating one or more attributes associated with a BSS that includes a plurality of STAs; mapping the plurality of STAs to a number (N) of time sectors based on the received network information so that at least one STA of the plurality of STAs is mapped to each of the N time sectors and each STA of the plurality of STAs is mapped to one or more of the N time sectors, where each of the N time sectors represents a respective interval of time that occurs periodically and does not overlap any of the remaining N−1 time sectors; and provisioning resources for communications with each STA of the plurality of STAs so that any communications with the STA occur within the respective one or more time sectors to which it is mapped and not outside the respective one or more time sectors.

Another innovative aspect of the subject matter described in this disclosure can be implemented as a method of wireless communication. The method may be performed by a wireless communication device and may include receiving network information indicating one or more attributes associated with one or more access points (APs); mapping the one or more APs to a number (M) time sectors based on the received network information so that each of the one or more APs is mapped to at least one of the M time sectors, where each of the M time sectors represents a respective interval of time that occurs periodically and does not overlap any of the remaining M−1 time sectors; and provisioning resources for communications with one or more STAs associated with the wireless communication device so that any communications with the one or more STAs occur outside the M time sectors to which the one or more APs are mapped. In some implementations, the resources may include time, frequency, memory, or processing resources. In some aspects, the one or more attributes may include the mapping of the one or more APs to the M time sectors.

In some aspects, the one or more attributes may include a latency requirement associated with communications between the one or more APs and any STAs associated with the one or more APs. In such aspects, the mapping of the one or more APs to the M time sectors may include mapping a first AP of the one or more APs to a first time sector of the M time sectors based on the network information indicating that the latency requirement associated with communications between the first AP and a first STA associated with the first AP is lower than a threshold latency requirement, where the first time sector is associated with communications between the first AP and the first STA.

In some aspects, the one or more attributes include a QoS requirement associated with multi-hop communications with any of the one or more APs. In such aspects, the mapping of the one or more APs to the M time sectors may include mapping a first AP of the one or more APs to a first time sector of the M time sectors based on the network information indicating that the QoS requirement associated with multi-hop communications with the first AP is greater than a threshold QoS requirement. In some implementations, the method may further include exchanging, with the first AP, data associated with the multi-hop communications within the first time sector.

In some aspects, the one or more attributes include a network topology associated with the one or more APs. In some implementations, the network topology may indicate whether hidden nodes are associated with any of the one or more APs. In such implementations, the mapping of the one or more APs to the M time sectors may include mapping a first AP of the one or more APs to a first time sector of the M time sectors based on the network information indicating that hidden nodes are associated with the first AP, where the first time sector is associated with communications between the first AP and one or more of the hidden nodes associated with the first AP.

In some other implementations, the network topology may indicate whether any STAs associated with the one or more APs are located within a coverage area associated with the wireless communication device. In such implementations, the mapping of the one or more APs to the M time sectors may include mapping a first AP of the one or more APs to a first time sector of the M time sectors based on the network information indicating that one or more STAs associated with the first AP are located within the coverage area associated with the wireless communication device, where the first time sector is associated with communications between the first AP and the one or more STAs associated with the first AP.

Another innovative aspect of the subject matter described in this disclosure can be implemented in a wireless communication device. In some implementations, the wireless communication device may include at least one processor and at least one memory communicatively coupled with the at least one processor and storing processor-readable code. In some implementations, execution of the processor-readable code by the at least one processor causes the wireless communication device to perform operations including include receiving network information indicating one or more attributes associated with one or more APs; mapping the one or more APs to a number (M) time sectors based on the received network information so that each of the one or more APs is mapped to at least one of the M time sectors, where each of the M time sectors represents a respective interval of time that occurs periodically and does not overlap any of the remaining M−1 time sectors; and provisioning resources for communications with one or more STAs associated with the wireless communication device so that any communications with the one or more STAs occur outside the M time sectors to which the one or more APs are mapped.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

Like reference numbers and designations in the various drawings indicate like elements.

DETAILED DESCRIPTION

Figure 1:
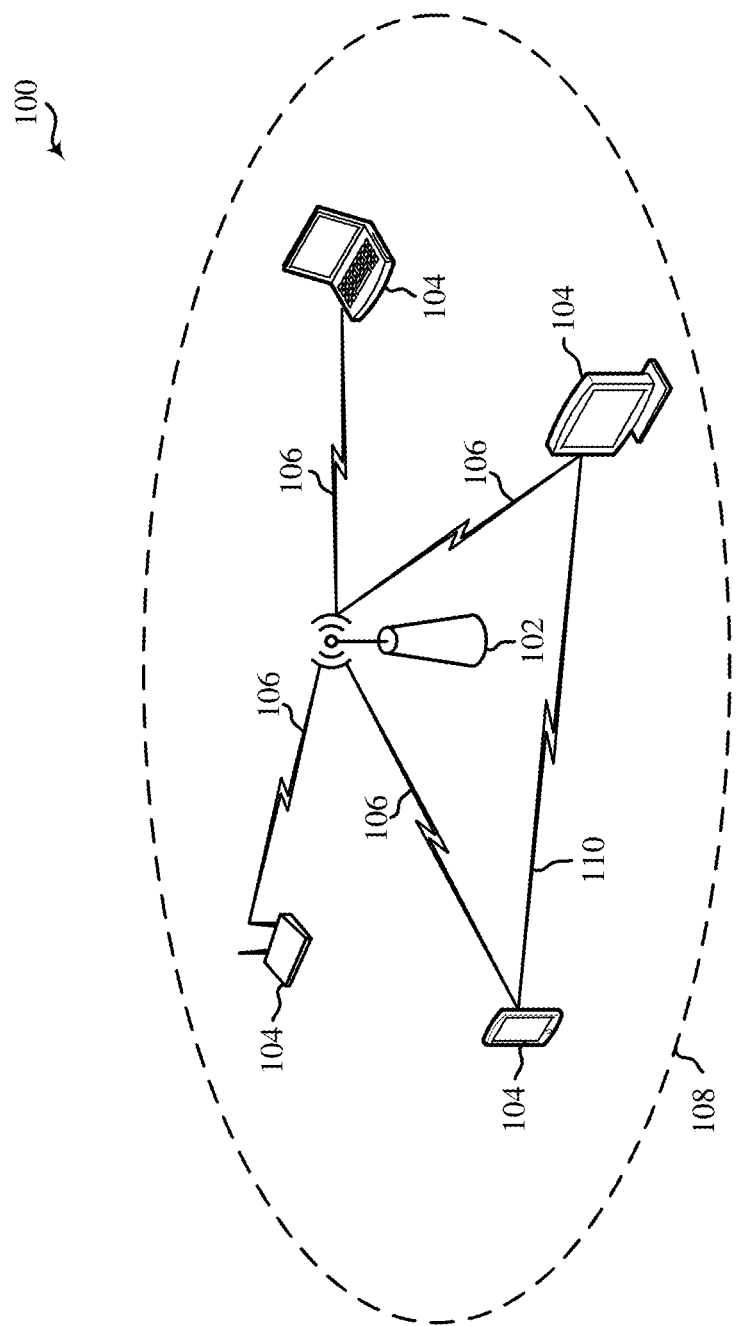
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

As described above, a "control loop" is a process by which an access point (AP) adjusts an allocation of resources (such as time, frequency, memory, or processing resources) for wireless stations (STAs) based on feedback from the wireless network. Many wireless communication devices (including APs and STAs) use clear channel assessment (CCA) techniques to detect whether a wireless medium is busy. More specifically, while a particular device is transmitting on a shared medium, other devices in the vicinity may detect the energy from such transmissions and refrain from accessing the shared medium to avoid collisions. As such, the number of wireless communication devices in a communication environment may affect the feedback associated with various control loops. For example, in a dense network, a rate selection scheme that relies on relatively slow packet error rate (PER) updates may not converge on an optimal modulation and coding scheme (MCS) for communications with a particular STA that exhibits poor signal-to-noise ratio (SNR) performance and long delays in medium access (such that the PER cannot settle). Aspects of the present disclosure recognize that an AP can improve the performance of various control loops by subdividing large groups of wireless communication devices into smaller subsets for resource allocation.

Various aspects relate generally to techniques for provisioning resources for wireless communications, and more particularly, to provisioning such resources based on a mapping of wireless communication devices (including APs or STAs) to network time sectors. As used herein, the term "time sector" generally refers to an interval of time that occurs periodically and does not overlap any other time sectors. In some aspects, a basic service set (BSS) may be temporally subdivided into a number (N) of time sectors. For example, an AP may map each of its associated STAs to at least one of the N time sectors based on one or more attributes associated with the BSS so that at least one of the STAs is mapped to each of the N time sectors. In such aspects, the AP may provision resources for communications with each STA so that any communications with the STA occur within the respective time sector(s) to which the STA is mapped and not outside the respective time sector(s). In some other aspects, a multi-AP environment (including a mesh network or overlapping BSSs (OBSSs)) may be temporally subdivided into a number (M) of time sectors. For example, a central controller may map each of the APs to at least one of the M time sectors based on one or more attributes associated with the multi-AP environment. In such aspects, each AP in the multi-AP environment may provision resources for communications with its associated STAs so that any communications with the STAs occur within the respective time sector(s) to which the AP is mapped and not outside the respective time sector(s).

Existing versions of the IEEE 802.11 standard provide several wireless communication protocols that can be used to allow some STAs to access a shared wireless medium during a given period of time while preventing other STAs from accessing the medium during the same period of time. Example suitable protocols may include restricted target wake time (r-TWT), multi-user (MU) enhanced distributed channel access (EDCA), and traffic indication map (TIM), among other examples. In some aspects, an AP may utilize r-TWT service periods (SPs), MU EDCA parameters, TIM information elements, or any combination thereof to allow each of its associated STAs to access a shared wireless medium during the time sector(s) to which the STA is mapped while preventing each of the STAs from accessing the shared wireless medium outside the time sector(s) to which the STA is mapped.

Particular implementations of the subject matter described in this disclosure can be implemented to realize one or more of the following potential advantages. By mapping the STAs associated with a BSS to N time sectors, an AP can configure various control loops to converge on resource allocations that are optimized for communications within each of the N time sectors based on a common subset of BSS attributes shared by the STAs mapped to the respective time sector. Example BSS attributes may include a volume of data traffic communicated with each STA, a direction of communications with each STA, capabilities supported by each STA, physical layer (PHY) modes supported by each STA, quality of service (QoS) requirements associated with each STA, network topology characteristics associated with each STA, channel characteristics associated with each STA, and service-level agreement (SLA) requirements associated with each STA, among other examples. By mapping multiple APs in a mesh network to M time sectors, aspects of the present disclosure may further improve the performance of control loops associated with serving hidden nodes or satisfying end-to-end QoS requirements for multi-hop transmissions in the mesh network. Still further, by mapping multiple APs representing OBSSs to M time sectors, aspects of the present disclosure may improve the performance of control loops associated with spatial reuse or satisfying the latency requirements associated with latency-sensitive data traffic in any of the OBSSs.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 106, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 700 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
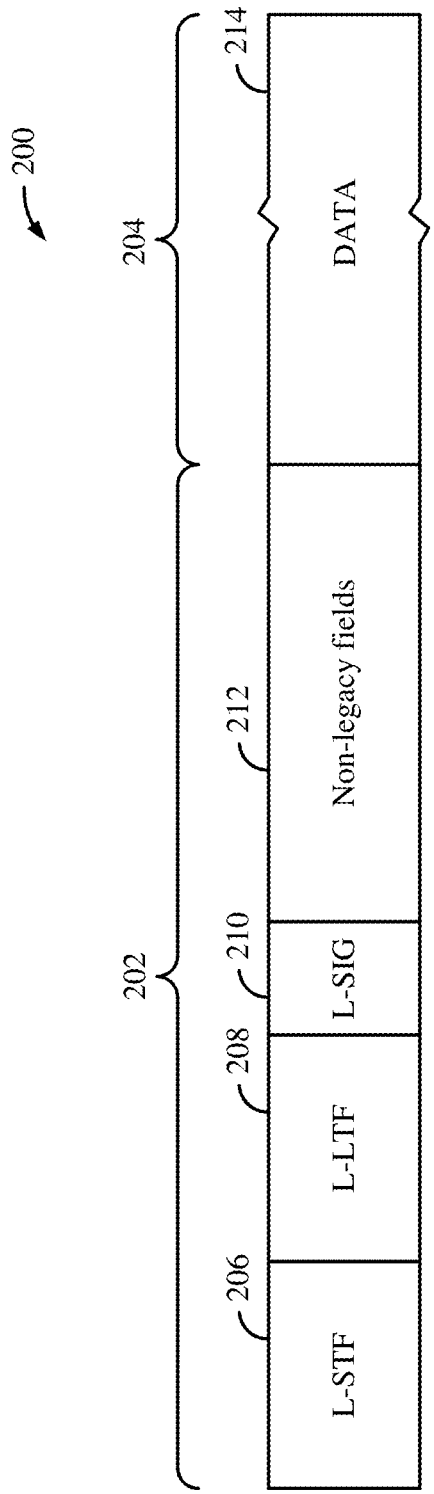
FIG. 2A shows an example protocol data unit (PDU) usable for communications between an access point (AP) and one or more wireless stations (STAs).

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
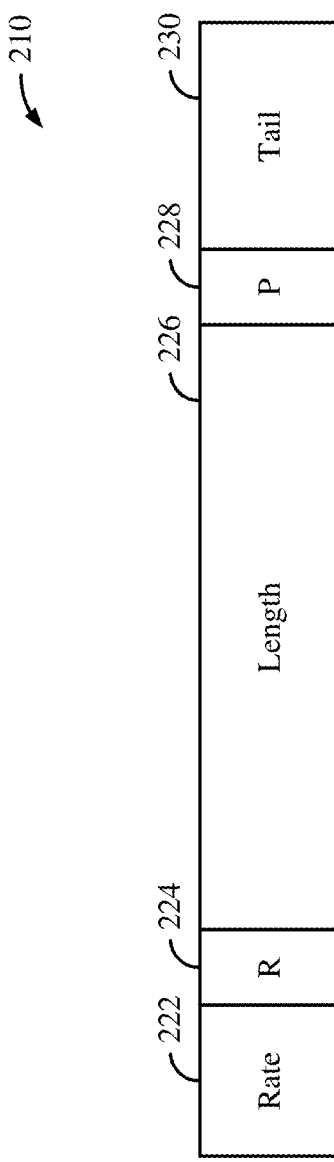
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (μs) or other time units.

Figure 3:
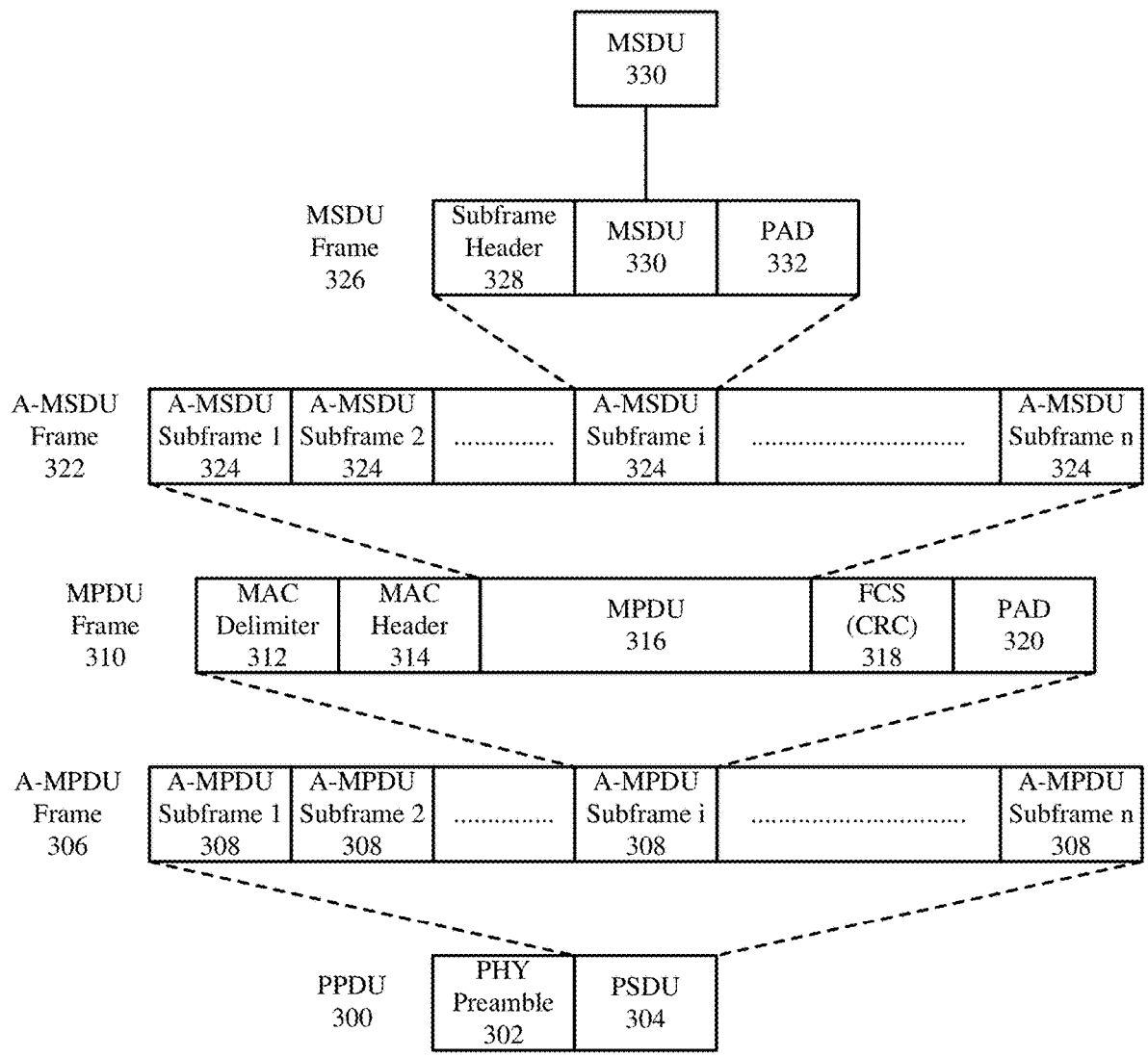
FIG. 3 shows an example physical layer convergence protocol (PLCP) protocol data unit (PPDU) usable for communications between an AP and one or more STAs.

FIG. 3 shows an example PPDU 300 usable for communications between an AP 102 and one or more STAs 104. As described above, each PPDU 300 includes a PHY preamble 302 and a PSDU 304. Each PSDU 304 may represent (or "carry") one or more MAC protocol data units (MPDUs) 316. For example, each PSDU 304 may carry an aggregated MPDU (A-MPDU) 306 that includes an aggregation of multiple A-MPDU subframes 308. Each A-MPDU subframe 306 may include an MPDU frame 310 that includes a MAC delimiter 312 and a MAC header 314 prior to the accompanying MPDU 316, which comprises the data portion ("payload" or "frame body") of the MPDU frame 310. Each MPDU frame 310 may also include a frame check sequence (FCS) field 318 for error detection (for example, the FCS field may include a cyclic redundancy check (CRC)) and padding bits 320. The MPDU 316 may carry one or more MAC service data units (MSDUs) 326. For example, the MPDU 316 may carry an aggregated MSDU (A-MSDU) 322 including multiple A-MSDU subframes 324. Each A-MSDU subframe 324 contains a corresponding MSDU 330 preceded by a subframe header 328 and in some cases followed by padding bits 332.

Referring back to the MPDU frame 310, the MAC delimiter 312 may serve as a marker of the start of the associated MPDU 316 and indicate the length of the associated MPDU 316. The MAC header 314 may include multiple fields containing information that defines or indicates characteristics or attributes of data encapsulated within the frame body 316. The MAC header 314 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 314 also includes one or more fields indicating addresses for the data encapsulated within the frame body 316. For example, the MAC header 314 may include a combination of a source address, a transmitter address, a receiver address or a destination address. The MAC header 314 may further include a frame control field containing control information. The frame control field may specify a frame type, for example, a data frame, a control frame, or a management frame.

Figure 4:
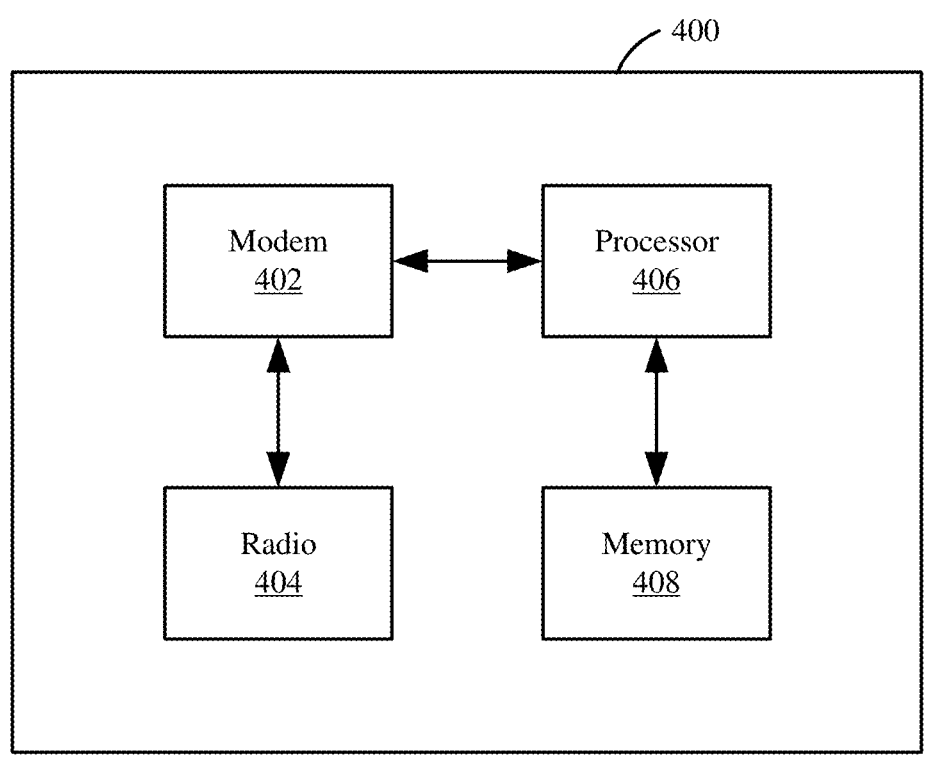
FIG. 4 shows a block diagram of an example wireless communication device.

FIG. 4 shows a block diagram of an example wireless communication device 400. In some implementations, the wireless communication device 400 can be an example of a device for use in a STA such as one of the STAs 104 described with reference to FIG. 1. In some implementations, the wireless communication device 400 can be an example of a device for use in an AP such as the AP 102 described with reference to FIG. 1. The wireless communication device 400 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 400 can be, or can include, a chip, system on chip (SoC), chipset, package or device that includes one or more modems 402, for example, a Wi-Fi (IEEE 802.11 compliant) modem. In some implementations, the one or more modems 402 (collectively "the modem 402") additionally include a WWAN modem (for example, a 3GPP 4G LTE or 5G compliant modem). In some implementations, the wireless communication device 400 also includes one or more radios 404 (collectively "the radio 404"). In some implementations, the wireless communication device 406 further includes one or more processors, processing blocks or processing elements 406 (collectively "the processor 406") and one or more memory blocks or elements 408 (collectively "the memory 408").

The modem 402 can include an intelligent hardware block or device such as, for example, an application-specific integrated circuit (ASIC) among other possibilities. The modem 402 is generally configured to implement a PHY layer. For example, the modem 402 is configured to modulate packets and to output the modulated packets to the radio 404 for transmission over the wireless medium. The modem 402 is similarly configured to obtain modulated packets received by the radio 404 and to demodulate the packets to provide demodulated packets. In addition to a modulator and a demodulator, the modem 402 may further include digital signal processing (DSP) circuitry, automatic gain control (AGC), a coder, a decoder, a multiplexer and a demultiplexer. For example, while in a transmission mode, data obtained from the processor 406 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 404. In implementations involving beamforming, the modulated symbols in the respective spatial streams are precoded via a steering matrix prior to their provision to the IFFT block.

While in a reception mode, digital signals received from the radio 404 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 406) for processing, evaluation or interpretation.

The radio 404 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 400 can include, or be coupled with, multiple transmit antennas (each with a corresponding transmit chain) and multiple receive antennas (each with a corresponding receive chain). The symbols output from the modem 402 are provided to the radio 404, which then transmits the symbols via the coupled antennas. Similarly, symbols received via the antennas are obtained by the radio 404, which then provides the symbols to the modem 402.

The processor 406 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 406 processes information received through the radio 404 and the modem 402, and processes information to be output through the modem 402 and the radio 404 for transmission through the wireless medium. For example, the processor 406 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 406 may generally control the modem 402 to cause the modem to perform various operations described above.

The memory 408 can include tangible storage media such as random-access memory (RAM) or read-only memory (ROM), or combinations thereof. The memory 408 also can store non-transitory processor- or computer-executable software (SW) code containing instructions that, when executed by the processor 406, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 5B:
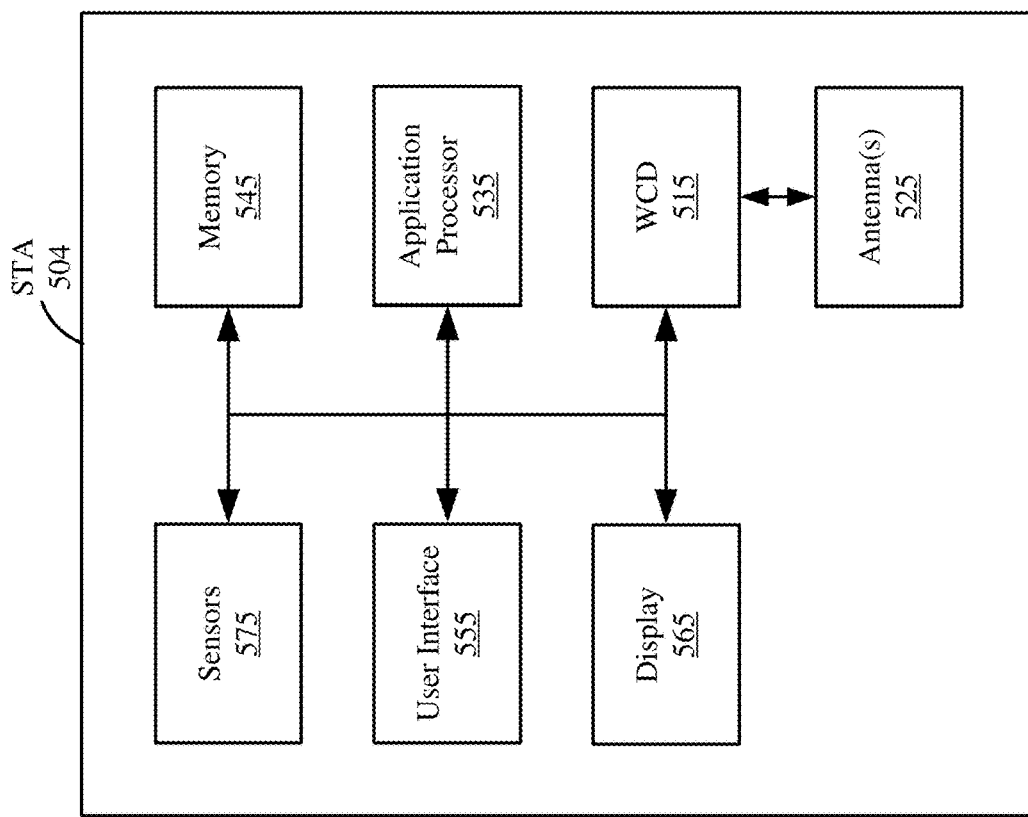
FIG. 5B shows a block diagram of an example STA.
Figure 5A:
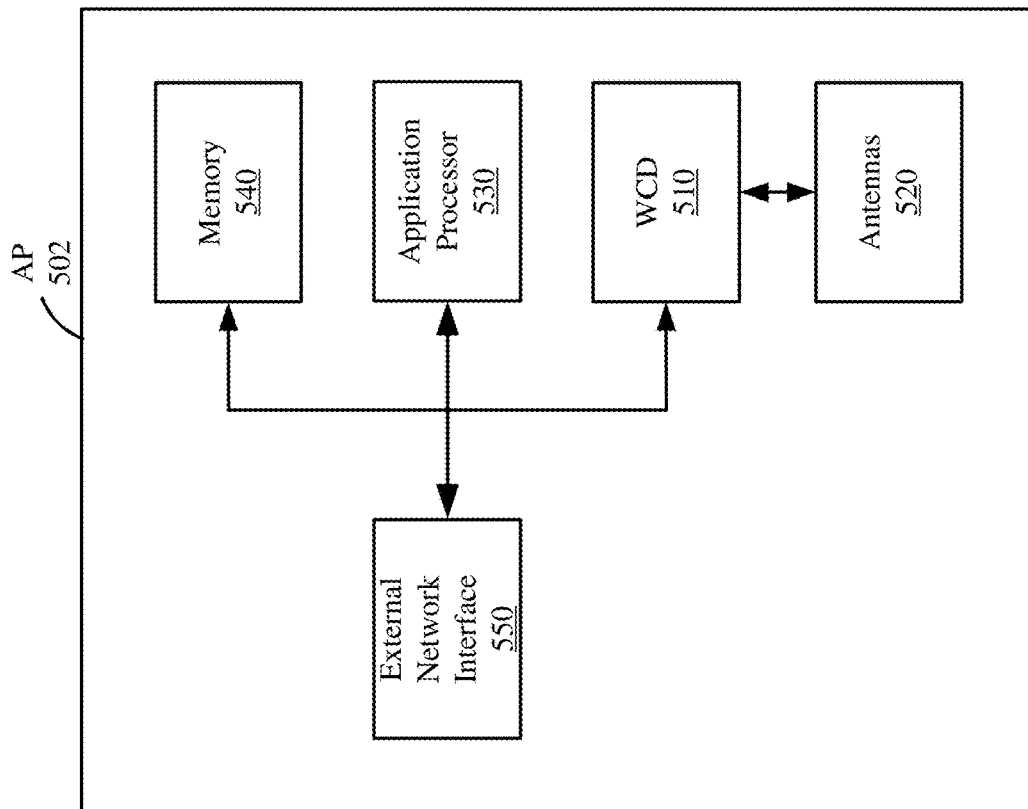
FIG. 5A shows a block diagram of an example AP.

FIG. 5A shows a block diagram of an example AP 502. For example, the AP 502 can be an example implementation of the AP 102 described with reference to FIG. 1. The AP 502 includes a wireless communication device (WCD) 510 (although the AP 502 may itself also be referred to generally as a wireless communication device as used herein). For example, the wireless communication device 510 may be an example implementation of the wireless communication device 400 described with reference to FIG. 4. The AP 502 also includes multiple antennas 520 coupled with the wireless communication device 510 to transmit and receive wireless communications. In some implementations, the AP 502 additionally includes an application processor 530 coupled with the wireless communication device 510, and a memory 540 coupled with the application processor 530. The AP 502 further includes at least one external network interface 550 that enables the AP 502 to communicate with a core network or backhaul network to gain access to external networks including the Internet. For example, the external network interface 550 may include one or both of a wired (for example, Ethernet) network interface and a wireless network interface (such as a WWAN interface). Ones of the aforementioned components can communicate with other ones of the components directly or indirectly, over at least one bus. The AP 502 further includes a housing that encompasses the wireless communication device 510, the application processor 530, the memory 540, and at least portions of the antennas 520 and external network interface 550.

FIG. 5B shows a block diagram of an example STA 504. For example, the STA 504 can be an example implementation of the STA 104 described with reference to FIG. 1. The STA 504 includes a wireless communication device 515 (although the STA 504 may itself also be referred to generally as a wireless communication device as used herein). For example, the wireless communication device 515 may be an example implementation of the wireless communication device 400 described with reference to FIG. 4. The STA 504 also includes one or more antennas 525 coupled with the wireless communication device 515 to transmit and receive wireless communications. The STA 504 additionally includes an application processor 535 coupled with the wireless communication device 515, and a memory 545 coupled with the application processor 535. In some implementations, the STA 504 further includes a user interface (UI) 555 (such as a touchscreen or keypad) and a display 565, which may be integrated with the UI 555 to form a touchscreen display. In some implementations, the STA 504 may further include one or more sensors 575 such as, for example, one or more inertial sensors, accelerometers, temperature sensors, pressure sensors, or altitude sensors. Ones of the aforementioned components can communicate with other ones of the components directly or indirectly, over at least one bus. The STA 504 further includes a housing that encompasses the wireless communication device 515, the application processor 535, the memory 545, and at least portions of the antennas 525, UI 555, and display 565.

As described above, a "control loop" is a process by which an AP adjusts an allocation of resources (such as time, frequency, memory, or processing resources) for STAs based on feedback from the wireless network. Many wireless communication devices (including APs and STAs) use CCA techniques to detect whether a wireless medium is busy. More specifically, while a particular device is transmitting on a shared medium, other devices in the vicinity may detect the energy from such transmissions and refrain from accessing the shared medium to avoid collisions. As such, the number of wireless communication devices in a communication environment may affect the feedback associated with various control loops. For example, in a dense network, a rate selection scheme that relies on relatively slow PER updates may not converge on an optimal MCS for communications with a particular STA that exhibits poor SNR performance and long delays in medium access (such that the PER cannot settle). Aspects of the present disclosure recognize that an AP can improve the performance of various control loops by subdividing large groups of wireless communication devices into smaller subsets for resource allocation.

Various aspects relate generally to techniques for provisioning resources for wireless communications, and more particularly, to provisioning resources for STAs mapped to network time sectors. As used herein, the term "time sector" generally refers to an interval of time that occurs periodically and does not overlap any other time sectors. In some aspects, a BSS may be temporally subdivided into a number (N) of time sectors. For example, an AP may map each of its associated STAs to at least one of the N time sectors based on one or more attributes associated with the BSS so that at least one of the STAs is mapped to each of the N time sectors. In such aspects, the AP may provision resources for communications with each STA so that any communications with the STA occur within the respective time sector(s) to which the STA is mapped and not outside the respective time sector(s). In some other aspects, a multi-AP environment (including as a mesh network or OBSSs) may be temporally subdivided into a number (M) of time sectors. For example, a central controller may map each of the APs to at least one of the M time sectors based on one or more attributes associated with the multi-AP environment. In such aspects, each AP in the multi-AP environment may provision resources for communications with its associated STAs so that any communications with the STAs occur within the respective time sector(s) to which the AP is mapped and not outside the respective time sector(s).

Particular implementations of the subject matter described in this disclosure can be implemented to realize one or more of the following potential advantages. By mapping the STAs associated with a BSS to N time sectors, an AP can configure various control loops to converge on resource allocations that are optimized for communications within each of the N time sectors based on a common subset of BSS attributes shared by the STAs mapped to the respective time sector. Example BSS attributes may include a volume of data traffic communicated with each STA, a direction of communications with each STA, capabilities supported by each STA, PHY modes supported by each STA, QoS requirements associated with each STA, network topology characteristics associated with each STA, channel characteristics associated with each STA, and SLA requirements associated with each STA, among other examples. By mapping multiple APs in a mesh network to M time sectors, aspects of the present disclosure may further improve the performance of control loops associated with serving hidden nodes or satisfying end-to-end QoS requirements for multi-hop transmissions in the mesh network. Still further, by mapping multiple APs representing OBSSs to M time sectors, aspects of the present disclosure may improve the performance of control loops associated with spatial reuse or satisfying the latency requirements associated with latency-sensitive data traffic in any of the OBSSs.

Figure 6:
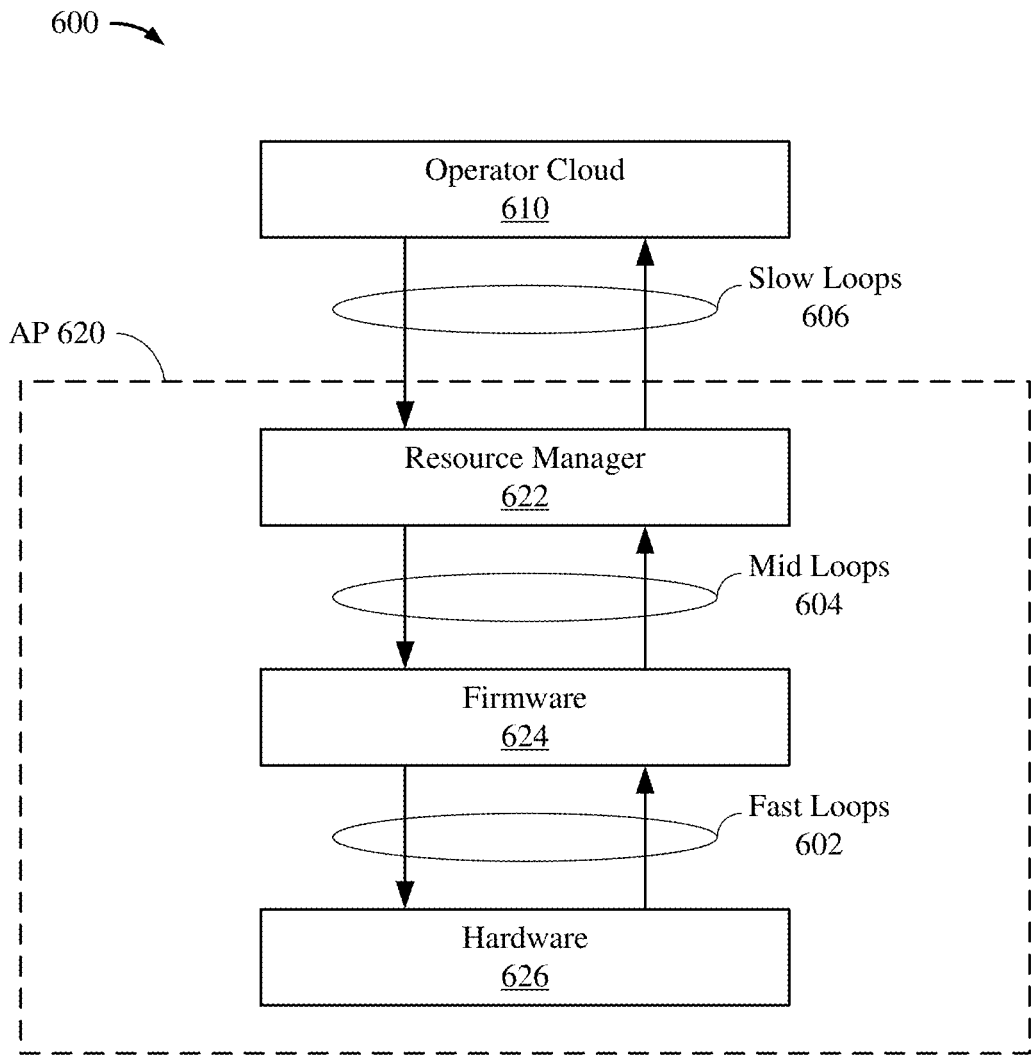
FIG. 6 shows a system of tiered control loops for wireless communication according to some implementations.

FIG. 6 shows a system 600 of tiered control loops for wireless communication according to some implementations. The example system 600 includes an operator cloud 610 and an AP 620. In some implementations, the AP 620 may be one example of any of the APs 102 or 502 of FIGS. 1 and 5A, respectively. The operator cloud 610 represents a backhaul network communicatively coupled to the AP 620 via an external network interface such as, for example, the external network interface 550 of FIG. 5A. In some implementations, the operator cloud 610 may include a network controller or any combination of hardware or software configured to control or manage various operations of the AP 620.

The AP 620 is shown to include a resource manager 622, a firmware component 624, and a hardware component 626. The firmware 624 and hardware 626 represent various components of a wireless communication device such as, for example, any of the wireless communication devices 400 or 510 of FIGS. 4 and 5A, respectively. With reference for example to FIG. 4, the hardware 626 may include one or more components of the modem 402 or the radio 404, and the firmware 624 may include one or more components of the processor 406 or the memory 408. Accordingly, the firmware 624 and hardware 626 may implement various PHY and MAC layer functionality associated with wireless communications. The resource manager 622 represents software executed by a host processor such as, for example, the application processor 530 of FIG. 5A. With reference for example to FIG. 5A, the resource manager 622 may include instructions stored in memory 540 that can be executed by the application processor 530 to control various operations of the WCD 510 (including the firmware 624 and hardware 626).

In some aspects, the system 600 may provide hierarchical levels of control for various aspects of wireless communication by the AP 620. In some implementations, the firmware 624 may implement one or more "fast" control loops 602 based on feedback from the hardware 626. The fast control loops 602 may control various resource allocation decisions that require fast convergence. Examples of fast control loops 602 may include just-in-time scheduling, smart enhanced distributed channel access (EDCA) adjustments, lazy or aggressive rate control, multi-user multiple-input multiple-output (MU-MIMO) or orthogonal frequency-division multiple access (OFDMA) grouping, and pausing or unpausing of traffic identifiers (TIDs), among other examples. For example, when implementing a fast control loop 602 associated with MU-MIMO operation, the firmware 624 may instruct the hardware 626 to concurrently communicate with multiple STAs (not shown for simplicity), as an MU-MIMO group, based on feedback from the STAs in response to a channel sounding operation. More specifically, the firmware 624 may assign the STAs to the MU-MIMO group upon determining that the STAs are associated with uncorrelated channels. Thus, the fast control loops 602 may adapt to instantaneous changes in the wireless communication environment.

In some implementations, the resource manager 622 may implement one or more "mid" control loops 604 based on feedback from the firmware 624. The mid control loops 604 may control various resource allocation decisions with slower convergence requirements than those associated with the fast control loops 602. Examples of mid control loops 604 may include multi-link operation (MLO) link provisioning, activating or deactivating multi-link device (MLD) links, enabling or disabling MU communications, enabling or disabling fast rate control, configuring rate control loop constants, configuring maximum data rates, enabling or disabling energy-efficient operation, and configuring uplink (UL) or downlink (DL) throttling limits, among other examples. For example, when implementing a mid control loop 604 associated with MU-MIMO operation, the resource manager 622 may instruct the firmware 624 to suspend or resume MU-MIMO communications with a group of STAs based on feedback associated with one or more STAs in the group. In some aspects, the decision to suspend or resume MU-MIMO communications with a particular group of STAs may be based on a mapping of the STAs to one or more time sectors. Thus, the mid control loops 604 may provide a dynamic range of execution for the fast control loops 602.

In some implementations, the operator cloud 610 may implement one or more "slow" control loops 606 based on feedback from the resource manager 622. The slow control loops 606 may control various resource allocation decisions with even slower convergence requirements than those associated with the mid control loops 604. Examples of slow control loops 606 may include setting link congestion thresholds and peer reliability thresholds for provisioned MLO and configuring parameters for managed MU staging, among other examples. For example, when implementing a slow control loop 606 associated with MU-MIMO operation, the operator cloud 610 may provide, to the resource manager 622, one or more boundary conditions for suspending or resuming MU-MIMO communications with any group of STAs. In some aspects, such boundary conditions may include network sectoring requirements for provisioning and deprovisioning time sectors. For example, the resource manager 622 may selectively enable (or disable) the use of time sectors for communications in a BSS based on whether one or more attributes associated with the BSS satisfy the network sectoring requirements. Thus, the slow control loops 606 may manage one or more decision thresholds for the mid control loops 604.

Figure 7A:
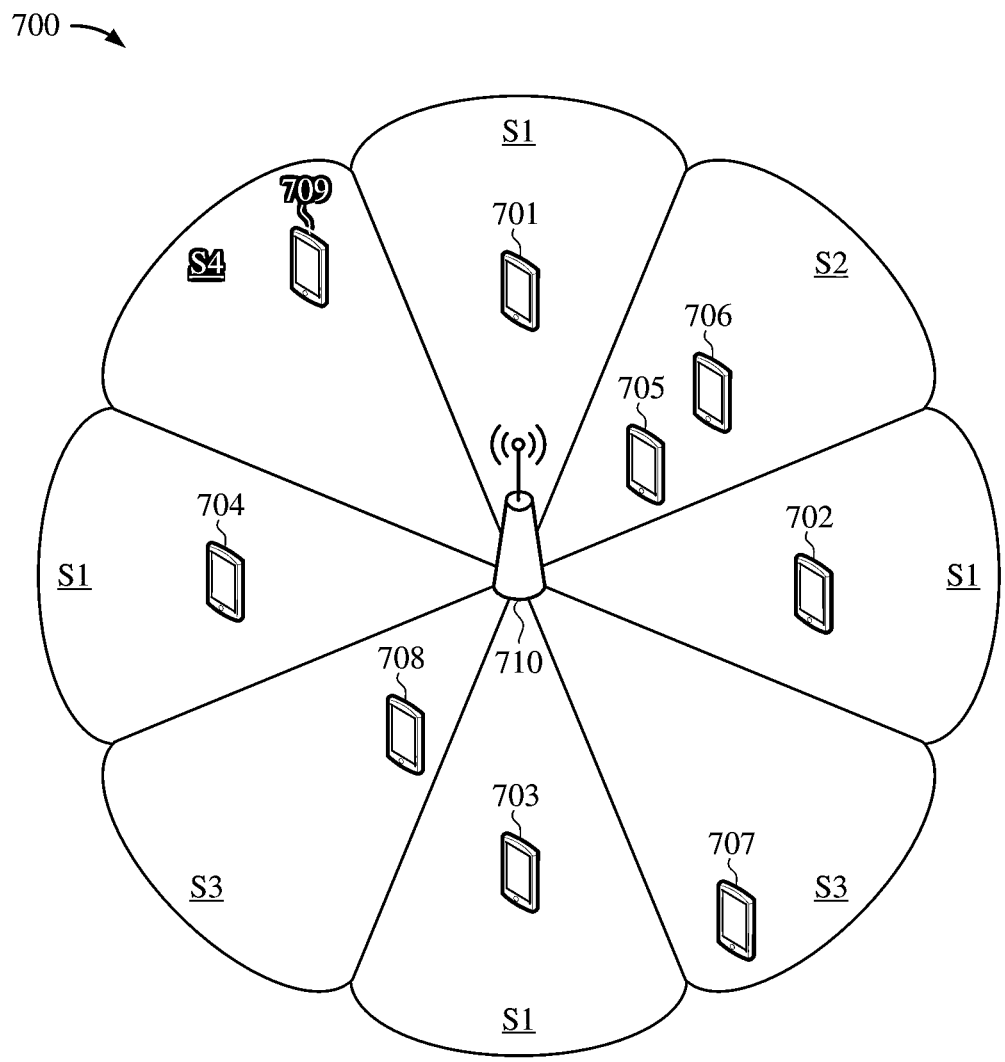
FIG. 7A shows an example basic service set (BSS) that includes an AP and multiple STAs, according to some implementations.

FIG. 7A shows an example basic service set (BSS) 700 that includes an AP 710 and multiple STAs 701-709, according to some implementations. In some implementations, the AP 710 may be one example of any of the APs 102, 502, or 620 of FIGS. 1, 5A, and 6, respectively. In some implementations, each of the STAs 701-709 may be one example of any of the STAs 104 or 504 of FIGS. 1 and 5B, respectively. For simplicity, nine STAs 701-709 are shown in FIG. 7A. However, in some other implementations, the BSS 700 may include fewer or more STAs than those depicted in FIG. 7A.

In some aspects, the AP 710 may temporally subdivide the BSS 700 into a number of time sectors S1-S4. In the example of FIG. 7A, the BSS 700 is shown to include four time sectors S1-S4. However, in some other implementations, the BSS 700 may include fewer or more time sectors than those depicted in FIG. 7A. Each of the time sectors S1-S4 represents a respective interval of time that occurs periodically and does not overlap any of the other time sectors. In some implementations, the AP 710 may map each of the STAs 701-709 to one or more of the time sectors S1-S4 so that at least one STA is mapped to each time sector. As shown in FIG. 7A, the STAs 701-704 are mapped to the first time sector S1, the STAs 705 and 706 are mapped to the second time sector S2, the STAs 707 and 708 are mapped to the third time sector S3, and the STA 709 is mapped to the fourth time sector S4. In the example of FIG. 7A, each of the STAs 701-709 is mapped to exactly one of the time sectors S1-S4. However, in some other implementations, one or more of the STAs 701-709 may be mapped to two or more of the time sectors S1-S4.

The AP 710 may determine the mapping of the STAs 701-709 to the time sectors S1-S4 based any number of factors. In some implementations, the AP 710 may map the STAs 701-709 to the time sectors S1-S4 in order of association identifier (AID) values. In such implementations, each of the time sectors S1-S4 may include a subset of the STAs 701-709 having AID values that fall within a respective range. In some other implementations, the AP 710 may map the STAs 701-709 to the time sectors S1-S4 based on one or more attributes associated with the BSS 700. In such implementations, each of the time sectors S1-S4 may include a respective subset of the STAs 701-709 sharing one or more common attributes. Example attributes may include a volume of data traffic communicated with each STA, a direction of communications with each STA, capabilities supported by each STA, PHY modes supported by each STA, QoS requirements associated with each STA, network topology characteristics associated with each STA, channel characteristics associated with each STA, and SLA requirements associated with each STA, among other examples.

Figure 7B:
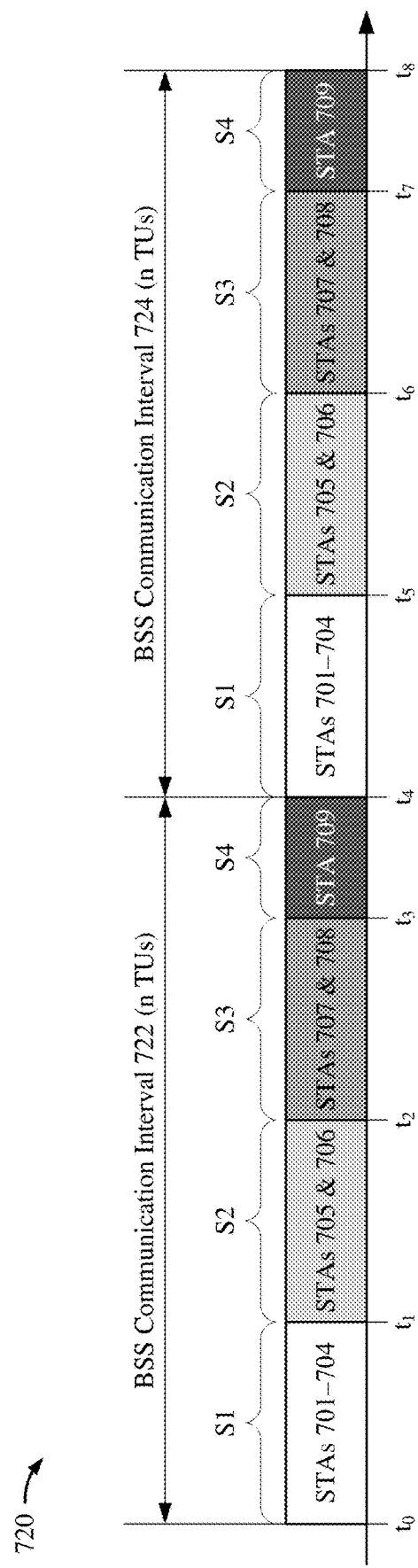
FIG. 7B shows a timing diagram depicting an example communication schedule associated with the BSS of FIG. 7A.

FIG. 7B shows a timing diagram 720 depicting an example communication schedule associated with the BSS 700 of FIG. 7A. As shown in FIG. 7B, the time sectors S1-S4 may collectively span a duration representing a BSS communication interval. More specifically, a first BSS communication interval 722 spans a number (n) of time units (TUs) between times $t_0$ and $t_4$ and a second BSS communication interval 724 spans n TUs between times $t_4$ and $t_8$. During the first BSS communication interval 722, the time sector S1 occurs between times $t_0$ and $t_1$, the time sector S2 occurs between times $t_1$ and $t_2$, the time sector S3 occurs between times $t_2$ and $t_3$, and the time sector S4 occurs between times $t_3$ and $t_4$. During the second BSS communication interval 724, the time sector S1 occurs between times $t_4$ and $t_5$, the time sector S2 occurs between times $t_5$ and $t_6$, the time sector S3 occurs between times $t_6$ and $t_7$, and the time sector S4 occurs between times $t_7$ and $t_8$. In the example of FIG. 7B, each of the time sectors S1-S4 is shown to occur only once during each of the BSS communication intervals 722 and 724. However, in some other implementations, one or more of the time sectors S1-S4 may be repeated during each BSS communication interval.

In some aspects, the AP 710 may provision resources for communications with each of the STAs 701-709 so that any communications with a given STA occur only during the time sector(s) to which the STA is mapped (and not during any time sectors to which the STA is not mapped). With reference for example to FIG. 7B, the STAs 701-704 may access the wireless medium between times $t_0$ and $t_1$ or between times $t_4$ and $t_5$ but may not access the wireless medium between times $t_1$ and $t_4$ or between times $t_5$ and $t_8$; the STAs 705 and 706 may access the wireless medium between times $t_1$ and $t_2$ or between times $t_5$ and $t_6$ but may not access the wireless medium between times $t_0$ and $t_1$, between times $t_2$ and $t_5$, or between times $t_6$ and $t_8$; the STAs 707 and 708 may access the wireless medium between times $t_2$ and $t_3$ or between times $t_6$ and $t_7$ but may not access the wireless medium between times $t_0$ and $t_2$, between times $t_3$ and $t_6$, or between times $t_7$ and $t_8$; and the STA 709 may access the wireless medium between times $t_3$ and $t_4$ or between times $t_7$ and $t_8$ but may not access the wireless medium between times $t_0$ and $t_3$ or between times $t_4$ and $t_7$.

Existing versions of the IEEE 802.11 standard provide several wireless communication protocols that can be used to allow some STAs to access a shared wireless medium during a given period of time while preventing other STAs from accessing the medium during the same period of time. Example suitable protocols may include restricted target wake time (r-TWT), multi-user (MU) EDCA, and traffic indication map (TIM), among other examples. In some aspects, the AP 710 may utilize r-TWT service periods (SPs), MU EDCA parameters, TIM information elements, or any combination thereof to allow each of the STAs 701-709 to access the shared wireless medium during the time sector(s) S1, S2, S3, or S4 to which the STA is mapped while preventing each of the STAs 701-709 from accessing the shared wireless medium outside the time sector(s) to which the STA is mapped.

Figure 8A:
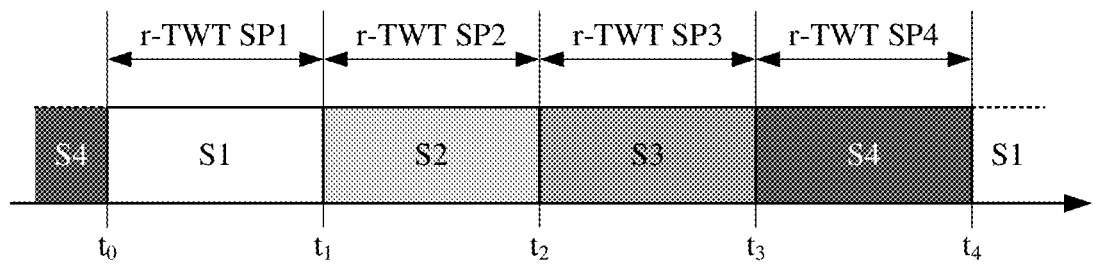
FIG. 8A shows a timing diagram depicting an example scheduling of wireless communications within a BSS, according to some implementations.

FIG. 8A shows a timing diagram 800 depicting an example scheduling of wireless communications within a BSS, according to some implementations. More specifically, FIG. 8A shows a provisioning of time sectors S1-S4 for communications between an AP and its associated STAs. In some implementations, the AP may be one example of any of the APs 102, 502, 620, or 710 of FIGS. 1, 5, 6, and 7A, respectively. In the example of FIG. 8A, the BSS is shown to include four time sectors S1-S4 that span a duration of a BSS communication interval. However, in some other implementations, the BSS may include fewer or more time sectors than those depicted in FIG. 8A.

In some implementations, the AP may provision each of the time sectors S1-S4 using r-TWT SPs. The IEEE 802.11 standard defines an r-TWT SP as a period of time that prioritizes medium access for members of the SP. Any STAs that support r-TWT operation and acquire transmit opportunities (TXOPs) outside of an r-TWT SP must terminate their respective TXOPs before the start of any r-TWT SP for which they are not a member. Further, an AP may suppress traffic from STAs that do not support r-TWT operation, during an r-TWT SP, by scheduling a quiet interval to overlap with the r-TWT SP. As such, aspects of the present disclosure recognize that r-TWT SPs can be used to allow some STAs to access a shared wireless medium during a given time sector (such as any STAs that are members of a respective r-TWT SP) while preventing other STAs from accessing the medium during the same time sector (such as any STAs that are not members of the respective r-TWT SP).

As shown in FIG. 8A, the AP may schedule a first r-TWT SP (SP1) to occur between times $t_0$ and $t_1$, which coincides with the first time sector S1, and may assign each of the STAs that are mapped to the time sector S1 (such as the STAs 701-704 of FIG. 7A) as members of SP1. The AP also may schedule a second r-TWT SP (SP2) to occur between times $t_1$ and $t_2$, which coincides with the second time sector S2, and may assign each of the STAs that are mapped to the time sector S2 (such as the STAs 705 and 706 of FIG. 7A) as members of SP2. The AP also may schedule a third r-TWT SP (SP3) to occur between times $t_2$ and $t_3$, which coincides with the third time sector S3, and may assign each of the STAs that are mapped to the time sector S3 (such as the STAs 707 and 708) as members of SP3. The AP also may schedule a fourth r-TWT SP (SP4) to occur between times $t_3$ and $t_4$, which coincides with the fourth time sector S4, and may assign each of the STAs that are mapped to the time sector S4 (such as the STA 709) as members of SP4.

Figure 8B:
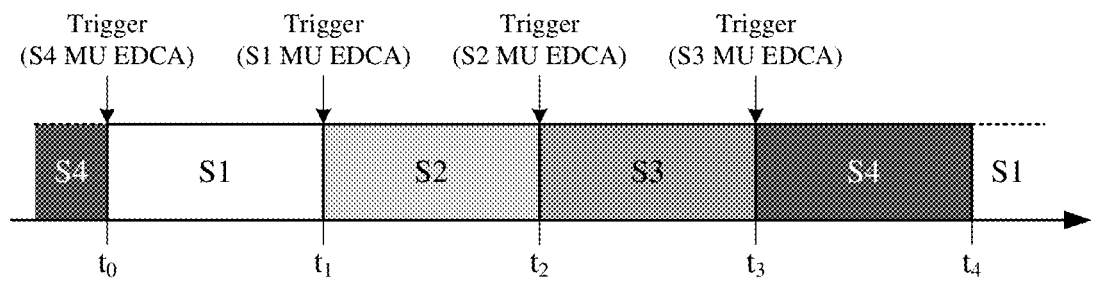
FIG. 8B shows another timing diagram depicting an example scheduling of wireless communications within a BSS, according to some implementations.

FIG. 8B shows another timing diagram 810 depicting an example scheduling of wireless communications within a BSS, according to some implementations. More specifically, FIG. 8B shows a provisioning of time sectors S1-S4 for communications between an AP and its associated STAs. In some implementations, the AP may be one example of any of the APs 102, 502, 620, or 710 of FIGS. 1, 5, 6, and 7A, respectively. In the example of FIG. 8B, the BSS is shown to include four time sectors S1-S4 that span a duration of a BSS communication interval. However, in some other implementations, the BSS may include fewer or more time sectors than those depicted in FIG. 8B.

In some implementations, the AP may provision each of the time sectors S1-S4 using MU EDCA parameter sets. The IEEE 802.11 standard defines a trigger frame format that can be used to solicit a trigger-based (TB) PPDU from multiple STAs. Any STAs that transmit a TB PPDU (responsive to a trigger frame from the AP) are required to use an MU EDCA parameter set when subsequently contending for medium access. The MU EDCA parameter set includes an arbitration inter-frame spacing number (AIFSN), minimum and maximum contention window values (ECWmin and ECWmax, respectively), and an MU EDCA timer indicating a duration of time for which the MU EDCA parameters are to be maintained. To ensure fairness of channel access by other STAs in a BSS, the MU EDCA parameters are generally higher than "legacy" EDCA parameters (which can be used by the other STAs). As such, aspects of the present disclosure recognize that one or more of the MU EDCA parameters (including AIFSN, ECWmin, ECWmax, or any combination thereof) can be configured to allow some STAs to access a shared wireless medium during a given time sector (using the legacy EDCA parameters) while preventing other STAs from accessing the medium during the same time sector (using the MU EDCA parameters).

At (or before) time $t_0$, which coincides with the start of the first time sector S1, the AP may transmit a trigger frame soliciting a TB PPDU from each of the STAs mapped to the previous time sector (such as S4). After transmitting the TB PPDU, the STAs mapped to the time sector S4 (such as the STA 709 of FIG. 7A) may refrain from accessing the wireless medium for at least a threshold duration associated with an MU EDCA parameter set. In some implementations, the MU EDCA parameters may be configured to prevent such STAs from accessing the wireless medium (or using legacy EDCA parameters) for the duration of a BSS communication interval (or until the next occurrence of the time sector S4). In some implementations, the AP may transmit an MU EDCA Reset frame, at time $t_0$, to one or more of the STAs mapped to the time sector S1 (such the STAs 701-704 of FIG. 7A) to allow the STAs to access the wireless medium using legacy EDCA parameters.

At (or before) time $t_1$, which coincides with the start of the second time sector S2, the AP may transmit a trigger frame soliciting a TB PPDU from each of the STAs mapped to the previous time sector (such as S1). After transmitting the TB PPDU, the STAs mapped to the time sector S1 (such as the STAs 701-704 of FIG. 7A) may refrain from accessing the wireless medium for at least a threshold duration associated with the MU EDCA parameter set. As described above, the MU EDCA parameters may be configured to prevent such STAs from accessing the wireless medium (or using legacy EDCA parameters) for the duration of a BSS communication interval (or until the next occurrence of the time sector S1). In some implementations, the AP may further transmit an MU EDCA Reset frame, at time $t_1$, to one or more of the STAs mapped to the time sector S2 (such the STAs 705 and 706 of FIG. 7A) to allow the STAs to access the wireless medium using legacy EDCA parameters.

At (or before) time $t_2$, which coincides with the start of the third time sector S3, the AP may transmit a trigger frame soliciting a TB PPDU from each of the STAs mapped to the previous time sector (such as S2). After transmitting the TB PPDU, the STAs mapped to the time sector S2 (such as the STAs 705 and 706 of FIG. 7A) may refrain from accessing the wireless medium for at least a threshold duration associated with the MU EDCA parameter set. As described above, the MU EDCA parameters may be configured to prevent such STAs from accessing the wireless medium (or using legacy EDCA parameters) for the duration of a BSS communication interval (or until the next occurrence of the time sector S2). In some implementations, the AP may further transmit an MU EDCA Reset frame, at time $t_2$, to one or more of the STAs mapped to the time sector S3 (such the STAs 707 and 708 of FIG. 7A) to allow the STAs to access the wireless medium using legacy EDCA parameters.

At (or before) time $t_3$, which coincides with the start of the fourth time sector S4, the AP may transmit a trigger frame soliciting a TB PPDU from each of the STAs mapped to the previous time sector (such as S3). After transmitting the TB PPDU, the STAs mapped to the time sector S3 (such as the STAs 707 and 708 of FIG. 7A) may refrain from accessing the wireless medium for at least a threshold duration associated with the MU EDCA parameter set. As described above, the MU EDCA parameters may be configured to prevent such STAs from accessing the wireless medium (or using legacy EDCA parameters) for the duration of a BSS communication interval (or until the next occurrence of the time sector S3). In some implementations, the AP may further transmit an MU EDCA Reset frame, at time $t_3$, to one or more of the STAs mapped to the time sector S4 (such the STA 709 of FIG. 7A) to allow the STAs to access the wireless medium using legacy EDCA parameters.

Figure 8C:
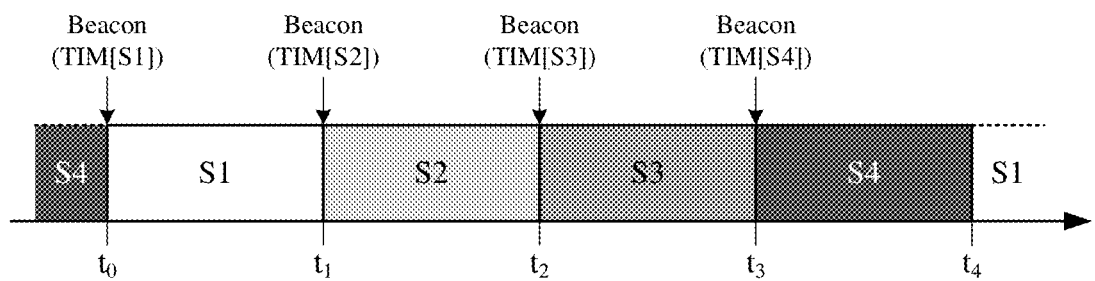
FIG. 8C shows another timing diagram depicting an example scheduling of wireless communications within a BSS, according to some implementations.

FIG. 8C shows another timing diagram 820 depicting an example scheduling of wireless communications within a BSS, according to some implementations. More specifically, FIG. 8C shows a provisioning of time sectors S1-S4 for communications between an AP and its associated STAs. In some implementations, the AP may be one example of any of the APs 102, 502, 620, or 710 of FIGS. 1, 5, 6, and 7A, respectively. In the example of FIG. 8C, the BSS is shown to include four time sectors S1-S4 that span a duration of a BSS communication interval. However, in some other implementations, the BSS may include fewer or more time sectors than those depicted in FIG. 8C.

In some implementations, the AP may provision each of the time sectors S1-S4 using a TIM information element carried in management frames (such as beacons). The IEEE 802.11 standard allows STAs to enter a power save mode to conserve power (or extend battery life). While operating in the power save mode, a STA cannot transmit, receive, or listen to communications on a wireless channel. However, the STA must periodically wake up (such as at beacon intervals or delivery TIM (DTIM) intervals) to receive beacon frames from its associated AP. Each beacon frame may carry a TIM (or DTIM) information element that identifies which, if any, of the STAs associated with the AP has buffered downlink (DL) data to receive. Any STAs identified by the TIM may exit the power save mode (or return to an active state) to receive the DL data from the AP, whereas STAs that are not identified by the TIM may return to the power save mode. As such, aspects of the present disclosure recognize that the TIM information element can be used to allow some STAs to access a shared wireless medium during a given time sector (such as STAs identified by the TIM) while preventing other STAs from accessing the medium during the same time sector (such as STAs not identified by the TIM).

At time $t_0$, which coincides with the start of the first time sector S1, the AP may transmit a beacon frame having a TIM information element that indicates an availability of DL data for each of the STAs mapped to the time sector S1 (such as the STAs 701-704 of FIG. 7A). At time $t_1$, which coincides with the start of the second time sector S2, the AP may transmit a beacon frame having a TIM information element that indicates an availability of DL data for each of the STAs mapped to the time sector S2 (such as the STAs 705 and 706 of FIG. 7A). At time $t_2$, which coincides with the start of the third time sector S3, the AP may transmit a beacon frame having a TIM information element that indicates an availability of DL data for each of the STAs mapped to the time sector S3 (such as the STAs 707 and 708 of FIG. 7A). At time $t_3$, which coincides with the start of the fourth time sector S4, the AP may transmit a beacon frame having a TIM information element that indicates an availability of DL data for each of the STAs mapped to the time sector S4 (such as the STA 709 of FIG. 7A).

In the example of FIG. 8C, each of the time sectors S1-S4 is shown to span a duration of a beacon interval. However, in some other implementations, multiple time sectors may occur within the span of a single beacon interval. In such implementations, the TIM information element in each beacon frame may indicate an availability of DL data for each STA mapped to any of the time sectors bounded by the current beacon interval. With reference for example to FIG. 8C, if a first beacon interval spans a duration from times $t_0$ to $t_2$ and a second beacon interval spans a duration from times $t_2$ to $t_4$, the beacon transmitted at time $t_0$ may carry a TIM information element indicating an availability of DL data for each of the STAs mapped to the time sectors S1 and S2 (such as the STAs 701-706 of FIG. 7A) and the beacon transmitted at time $t_2$ may carry a TIM information element indicating an availability of DL data for each of the STAs mapped to the time sectors S3 and S4 (such as the STAs 707-709 of FIG. 7A).

Figure 9:
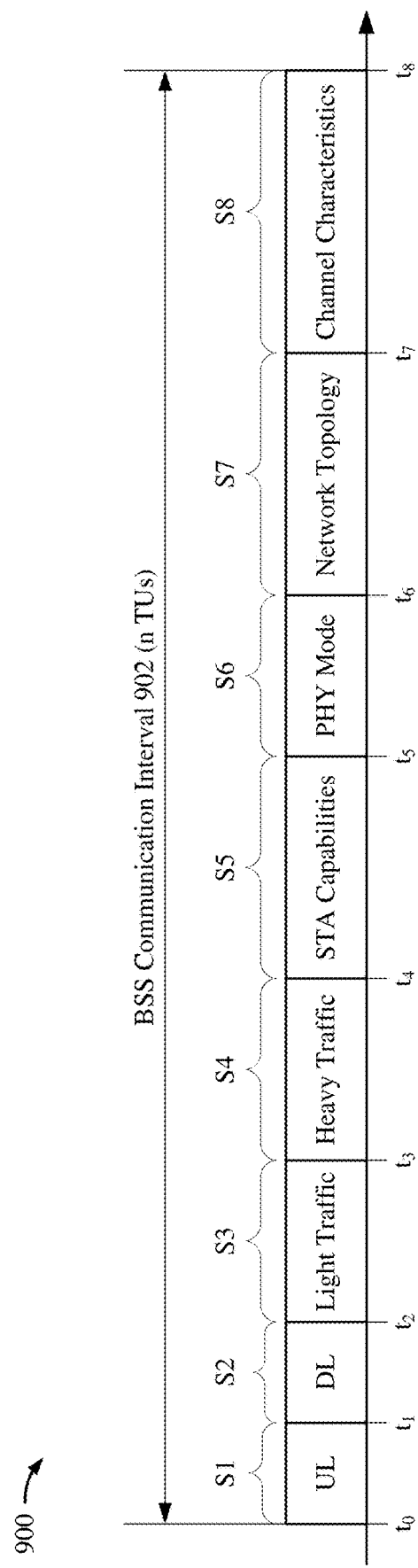
FIG. 9 shows a timing diagram depicting an example communication schedule associated with a BSS, according to some implementations.

FIG. 9 shows a timing diagram 900 depicting an example communication schedule associated with a BSS, according to some implementations. More specifically, FIG. 9 shows a number of time sectors S1-S8 that can be provisioned by an AP for communications with its associated STAs. In some implementations, the AP may be one example of any of the APs 102, 502, 620, or 710 of FIGS. 1, 5, 6, and 7A, respectively. In the example of FIG. 9, the BSS is shown to include eight time sectors S1-S8 that span a duration of a BSS communication interval 902 (such as n TUs). However, in some other implementations, the BSS may include fewer or more time sectors than those depicted in FIG. 9. For example, in some implementations, a BSS communication interval may include any combination of the STAs S1-S8.

In some aspects, the AP may map each of its associated STAs to one or more of the time sectors S1-S8 based on one or more attributes associated with the STA. More specifically, in the example of FIG. 9, each STA may be mapped to one or more of the time sectors S1-S8 based on telemetry (or feedback) received from the STAs. With reference for example to FIG. 6, the mapping may be performed by the resource manager 622 based on feedback from the firmware 624 (such as via one or more mid loops 604) and one or more service parameters or boundary conditions set or otherwise specified by the operator cloud 610 (such as via one or more slow loops 606). In some implementations, the operator cloud 610 may specify respective thresholds or conditions that must be met for a STA to be included in each of the time sectors S1-S8.

In some implementations, the AP may map one or more STAs to the time sector S1 (which occurs between times $t_0$ and $t_1$), and may map one or more STAs to the time sector S2 (which occurs between times $t_1$ and $t_2$), based on a direction of communications with the STA. As described above, the IEEE 802.11 standard defines several MU communication techniques that can be used to concurrently communicate with multiple users in the DL direction or the UL direction. Thus, aspects of the present disclosure recognize that the AP can improve the medium usage efficiency of the BSS by mapping STAs that predominantly receive DL data (such as where the DL data represents at least a threshold percentage of all data traffic communicated with the STA) to one or more first time sectors and by mapping STAs that predominantly transmit UL data (such as where the UL data represents at least a threshold percentage of all data traffic communicated with the STA) to one or more second time sectors that are orthogonal to the one or more first time sectors.

In some implementations, the AP may map one or more STAs to the time sector S3 (which occurs between times $t_2$ and $t_3$), and may map one or more STAs to the time sector S4 (which occurs between times $t_3$ and $t_4$), based on a volume of data traffic (or traffic load) communicated with the STA. As described above, STAs often enter a power save mode to conserve power (or extend battery life). However, a STA with relatively light data traffic may experience significant delays in entering the power save mode when the wireless medium is occupied by another STA with heavy data traffic. By contrast, STAs with relatively heavy data traffic may rarely enter a power save mode. Thus, aspects of the present disclosure recognize that the AP can improve the medium usage efficiency of the BSS by mapping STAs with light data traffic (such as below a threshold traffic volume) to one or more first time sectors and by mapping STAs with heavy data traffic (such as above a threshold traffic volume) to one or more second time sectors that are orthogonal to the one or more first time sectors.

In some implementations, the AP may map one or more STAs to the time sector S5 (which occurs between times $t_4$ and $t_5$) based on one or more capabilities supported by the STAs. Aspects of the present disclosure recognize that, because STAs with different capabilities may require different amounts of communication overhead, the AP may improve the medium usage efficiency of the BSS by mapping STAs that support one or more common capabilities to the same time sector(s). For example, some STAs may support DL MU-MIMO communications. In DL MU-MIMO communications, the AP provisions a respective spatial stream for DL transmissions to each STA in an MU group. Each spatial stream is transmitted, using beamforming, in the direction of a respective STA. As such, the AP must perform a channel sounding operation, prior to any DL MU-MIMO transmission, to determine a respective beam direction associated with each STA in the MU group. Because the channel sounding operations require significant overhead, the AP may improve the medium usage efficiency of the BSS by mapping STAs that support MU-MIMO communications to the same time sector(s).

In some implementations, the AP may map one or more STAs to the time sector S6 (which occurs between times $t_5$ and $t_6$) based on one or more PHY modes supported by the STAs. As used herein, the term "PHY mode" refers to one or more versions or releases of the IEEE 802.11 standard. For example, some STAs may support the IEEE 802.11be amendment, or future versions, of the IEEE 802.11 standard (referred to herein as a "non-legacy" PHY mode) and some other STAS may only support the IEEE 802.11ax amendment, or earlier versions, of the IEEE 802.11 standard (referred to herein as a "legacy" PHY mode). The non-legacy PHY mode includes enhanced features (such as increases in the bandwidth of communications) that require different PPDU (or PHY preamble) formats, with additional signaling overhead, compared to the legacy PHY mode. Aspects of the present disclosure recognize that, because STAs that support different PHY modes may require different amounts of communication overhead, the AP may improve the medium usage efficiency of the BSS by mapping STAs that support the same PHY modes to the same time sector(s).

In some implementations, the AP may map one or more STAs to the time sector S7 (which occurs between times $t_6$ and $t_7$) based on one or more network topology characteristics associated with the STAs. Example network topology characteristics may include, among other examples, an orientation, location, or path loss associated with each STA. Aspects of the present disclosure recognize that STAs with substantially similar network topology characteristics are less likely to be hidden nodes and STAs with substantially different network topology characteristics are more likely to be hidden nodes. A "hidden node" refers to any STA that is unable to detect the communications of other STAs in a BSS (such as STAs located on opposite edges of the BSS). As a result, hidden nodes may attempt to transmit over the wireless medium while the medium is busy, which can result in collisions. Thus, the AP can reduce collisions in the BSS by mapping STAs with similar network topology characteristics (such as an orientation, location, or path loss that falls within a threshold range of values) to one or more first time sectors and by mapping STAs with different network topology characteristics (such as an orientation, location, or path loss that is outside a threshold range of values) to one or more second time sectors that are orthogonal to the one or more first time sectors.

In some implementations, the AP may map one or more STAs to the time sector S8 (which occurs between times $t_7$ and $t_8$) based on one or more channel characteristics associated with the STAs. Example channel characteristics may include, among other examples, a channel correlation metric, Doppler shift, or delay spread associated with each STA (or group of STAs). As described above, DL MU-MIMO transmissions are carried on orthogonal beams. As such, the STAs associated with an MU group must be spatially diverse or otherwise communicate over uncorrelated channels. Thus, in some aspects, the AP may improve the medium usage efficiency of the BSS by mapping some STAs with substantially different channel characteristics (such as indicated by the channel correlation metric) to the same time sector(s). On the other hand, STAs that are highly mobile may be less suitable for MU-MIMO communications than STAs that are relatively stationary. Thus, in some other aspects, the AP may improve the medium usage efficiency of the BSS by mapping some STAs with substantially similar channel characteristics (such as indicated by the Doppler shift) to the same time sector(s).

Figure 10:
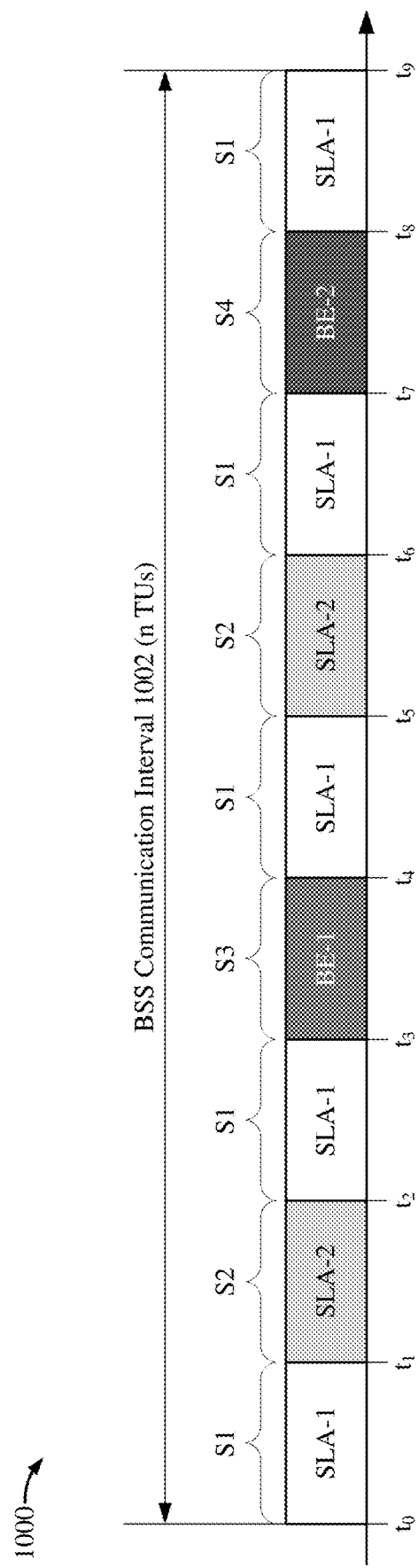
FIG. 10 shows a timing diagram depicting an example communication schedule associated with a BSS, according to some implementations.

FIG. 10 shows a timing diagram 1000 depicting an example communication schedule associated with a BSS, according to some implementations. More specifically, FIG. 10 shows a number of time sectors S1-S4 that can be provisioned by an AP for communications with its associated STAs. In some implementations, the AP may be one example of any of the APs 102, 502, 620, or 710 of FIGS. 1, 5, 6, and 7A, respectively. In the example of FIG. 10, the BSS is shown to include four time sectors S1-S4 that span a duration of a BSS communication interval 1002 (such as n TUs). However, in some other implementations, the BSS may include fewer or more time sectors than those depicted in FIG. 10. For example, in some implementations, one or more of the time sectors S1-S4 of FIG. 10 may be combined with one or more of the time sectors S1-S8 of FIG. 9 within a BSS communication interval.

In some aspects, the AP may map each of its associated STAs to one or more of the time sectors S1-S4 based on one or more attributes associated with each STA's traffic flows. More specifically, in the example of FIG. 10, each STA may be mapped to one or more of the time sectors S1-S4 based on a service-level agreement (SLA) associated with the STA's traffic flows. With reference for example to FIG. 6, the mapping may be performed by the resource manager 622 based on feedback from the firmware 624 (such as via one or more mid loops 604) and one or more service parameters or boundary conditions set or otherwise specified by the operator cloud 610 (such as via one or more slow loops 606). In some implementations, the operator cloud 610 may specify respective thresholds or conditions that must be met for a STA to be included in each of the time sectors S1-S4.

An SLA is an agreement between a service provider (such as an ISP) and a client that specifies various responsibilities of each party (such as data rate, quality of service (QoS), availability of services, and payment for services, among other examples). More specifically, an SLA may specify a class of services to be provided by the service provider to a particular client. The service class generally defines how data traffic is prioritized for the client or STA. For example, data traffic associated with higher service classes may be prioritized over data traffic associated with lower service classes. Accordingly, STAs associated with higher service classes may receive a greater number of scheduling grants (for example, to transmit or receive data over a shared wireless medium) than STAs associated with lower service classes.

In some implementations, the AP may map one or more STAs associated with the same service class to the same time sector(s). More specifically, STAs associated with higher-priority SLA requirements (such as above a threshold priority level) may be mapped to one or more first time sectors and STAs associated with lower-priority SLA requirements (such as below a threshold priority level) may be mapped to one or more second time sectors that are different than the one or more first time sectors. Further, the AP may schedule or provision the one or more first time sectors to occur more frequently than the one or more second time sectors, for example, to ensure that a service provider can satisfy one or more conditions (such as data rate, QoS, or availability of services) under its SLA with each client.

In the example of FIG. 10, STAs having the highest-priority SLA requirements (SLA-1) are mapped to the time sector S1, which occurs between times $t_0$ and $t_1$, between times $t_2$ and $t_3$, between times $t_4$ and $t_5$, between times $t_6$ and $t_7$, and between times $t_8$ and $t_9$. Further, STAs having lower-priority SLA requirements (SLA-2) are mapped to the time sector S2, which occurs between times $t_1$ and $t_2$ and between times $t_5$ and $t_6$. On the other hand, STAs that have only best-effort (BE) data traffic to transmit or receive are mapped to the time sector S3, which occurs between times $t_3$ and $t_4$, or to the time sector S4, which occurs between times $t_7$ and $t_8$.

As described with reference to FIGS. 7A-10, an AP may substantially improve the medium usage efficiency of its BSS by temporally subdividing the BSS into a number of time sectors. However, aspects of the present disclosure recognize that restricting medium access by time sectors may not be desirable under some circumstances. For example, in sparsely populated networks, restricting medium access by time sectors may increase the latency of communications or otherwise result in inefficient medium utilization by the STAs. Thus, in some implementations, the AP may selectively enable (and disable) the use of time sectors for wireless communications in its BSS when one or more conditions are met (such as the BSS having a threshold number of STAs). With reference for example to FIG. 6, the resource manager 622 may determine whether to enable or disable the time sectors based on feedback from the firmware 624 (such as via one or more mid loops 604) and one or more thresholds or conditions set or otherwise specified by the operator cloud 610 (such as via one or more slow loops 606).

Figure 11A:
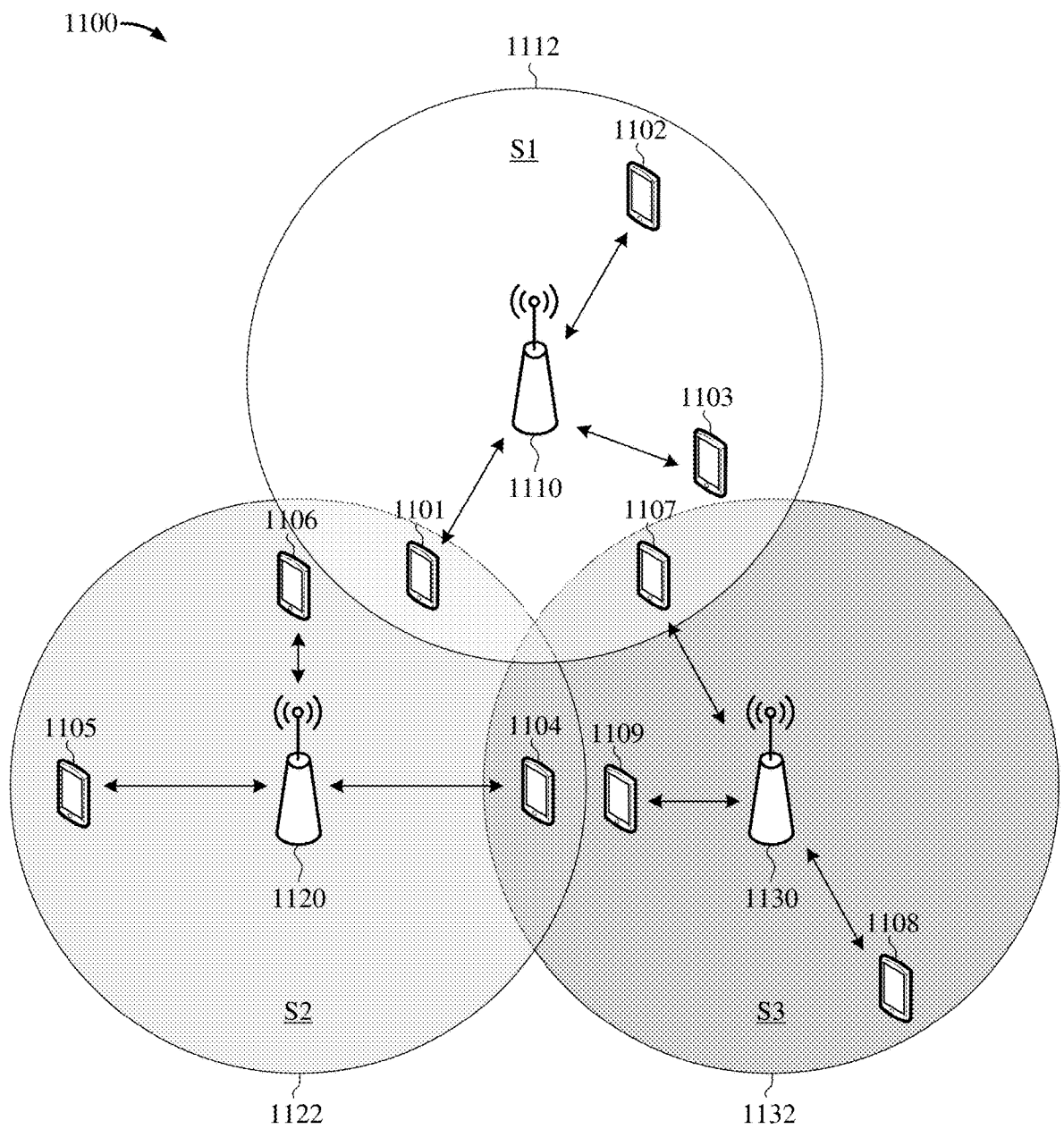
FIG. 11A shows an example wireless communication environment that includes multiple APs and multiple STAs.

FIG. 11A shows an example wireless communication environment 1100 that includes multiple APs 1110, 1120, and 1130 and multiple STAs 1101-1109. As shown in FIG. 11A, the APs 1110, 1120, and 1130 are shown to have overlapping coverage areas 1112, 1122, and 1132, respectively. In some implementations, each of the APs 1110, 1120, and 1130 may be one example of any of the APs 102, 502, 620, or 710 of FIGS. 1, 5A, 6, and 7A, respectively. In some implementations, each of the STAs 1101-1109 may be one example of any of the STAs 104 or 504 of FIGS. 1 and 5B, respectively. In the example of FIG. 11A, the STAs 1101-1103 are associated with the AP 1110, the STAs 1104-1106 are associated with the AP 1120, and the STAs 1107-1109 are associated with the AP 1130.

In some implementations, the wireless communication environment 1100 may include a mesh network. In such implementations, one of the APs 1110, 1120, or 1130 may be a root AP (such as an AP connected to a backhaul network)

and the remaining APs may be range extenders. The range extenders forward communications between the root AP and one or more STAs. End-to-end communications (between the root AP and a respective STA) that involve range extenders are referred to as "multi-hop" communications. In some other implementations, the wireless communication environment 1100 may include OBSSs. In such implementations, each of the APs 1110, 1120, and 1130 may represent a separate infrastructure BSS. In other words, each of the APs 1110, 1120, and 1130 may be directly connected to a backhaul network. As such, the STAs 1101-1109 may not require multiple "hops" to communicate with any of the APs 1110, 1120, or 1130.

In some aspects, a central controller may temporally subdivide the wireless communication environment 1100 into a number of time sectors S1-S3. In some implementations, the central controller may be one of the APs 1110, 1120, or 1130. For example, the central controller may be a root AP (in a mesh network) or a "master AP" (among OBSSs). In some other implementations, the central controller may be a network controller (not shown for simplicity) communicatively coupled to one or more of the APs 1110, 1120, or 1130 via a backhaul network. In the example of FIG. 11A, the wireless communication environment 1100 is shown to include three time sectors S1-S3. However, in some other implementations, the wireless communication environment 1100 may include fewer or more time sectors than those depicted in FIG. 11A. Each of the time sectors S1-S3 represents a respective interval of time that occurs periodically and does not overlap any of the other time sectors.

In some implementations, the central controller may map each of the APs 1110, 1120, and 1130 to one or more of the time sectors S1-S3 so that at least one AP is mapped to each time sector. As shown in FIG. 11A, the AP 1110 is mapped to the first time sector S1, the AP 1120 is mapped to the second time sector S2, and the AP 1130 is mapped to the third time sector S3. In the example of FIG. 11A, each of the APs 1110, 1120, and 1130 is mapped to exactly one of the time sectors S1-S3. However, in some other implementations, one or more of the APs 1110, 1120, or 1130 may be mapped to two or more of the time sectors S1-S3. In some implementations, a network controller operating as the central controller may communicate the mapping to each of the APs 1110, 1120, and 1130 (such as via a backhaul network). In some other implementations, one of the APs 1110, 1120, or 1130 operating as the central controller may communicate the mapping to the other APs (such as via a backhaul network or wireless communication packets or frames).

The central controller may determine the mapping of the APs 1110, 1120, or 1130 to the time sectors S1-S3 based on any number of factors. In some aspects, the central controller may map the APs 1110, 1120, and 1130 to the time sectors S1-S3 based on one or more attributes associated with each AP. In some implementations, the APs 1110, 1120, and 1130 may be mapped to the time sectors S1-S3 based on a network topology associated with one or more of the APs 1110, 1120, or 1130. In some other implementations, the APs 1110, 1120, and 1130 may be mapped to the time sectors S1-S3 based on a QoS requirement associated with multi-hop communications with one or more of the APs 1110, 1120, or 1130. Still further, in some implementations, the APs 1110, 1120, and 1130 may be mapped to the time sectors S1-S3 based on a latency requirement associated with communications between one or more of the APs 1110, 1120, or 1130 and one or more of the STAs 1101-1109.

Figure 11B:
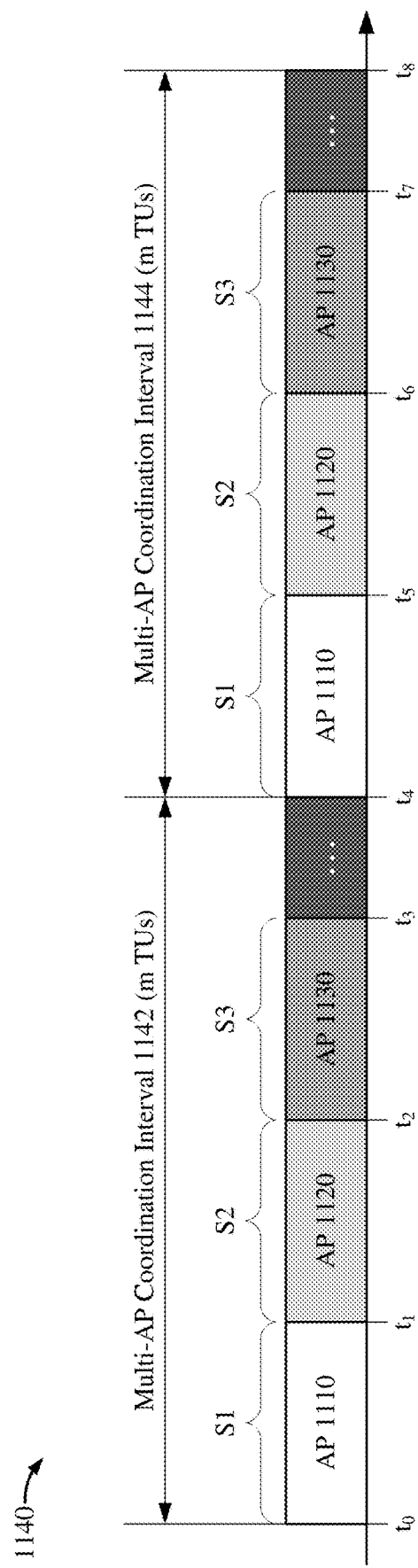
FIG. 11B shows a timing diagram depicting an example communication schedule associated with the wireless communication environment of FIG. 11A.

FIG. 11B shows a timing diagram 1140 depicting an example communication schedule associated with the wireless communication environment 1100 of FIG. 11A. As shown in FIG. 11B, the time sectors S1-S3 may span at least a portion of a multi-AP coordination interval. More specifically, a first multi-AP coordination interval 1142 spans a number (m) of TUs between times $t_0$ and $t_4$ and a second multi-AP coordination interval 1144 spans m TUs between times $t_4$ and $t_8$. During the first multi-AP coordination interval 1142, the time sector S1 occurs between times $t_0$ and $t_1$, the time sector S2 occurs between times $t_1$ and $t_2$, and the time sector S3 occurs between times $t_2$ and $t_3$. During the second multi-AP coordination interval 1144, the time sector S1 occurs between times $t_4$ and $t_5$, the time sector S2 occurs between times $t_5$ and $t_6$, and the time sector S3 occurs between times $t_6$ and $t_7$. In the example of FIG. 11B, each of the time sectors S1-S3 is shown to occur only once during each of the multi-AP coordination intervals 1142 and 1144. However, in some other implementations, one or more of the time sectors S1-S3 may be repeated during each multi-AP coordination interval.

In some aspects, each of the APs 1110, 1120, and 1130 may provision resources for communications with other wireless communication devices (including its associated STAs or other APs) so that any communications with the other wireless communication devices occur only during the time sector(s) to which the AP is mapped. With reference for example to FIG. 11B, the AP 11110 may provision resources for wireless communications between times $t_0$ and $t_1$ or between times $t_4$ and $t_5$ but may not provision resources for wireless communications between times $t_1$ and $t_3$ or between times $t_5$ and $t_7$; the AP 1120 may provision resources for wireless communications between times $t_1$ and $t_2$ or between times $t_5$ and $t_6$ but may not provision resources for wireless communications between times $t_0$ and $t_1$, between times $t_2$ and $t_3$, between times $t_4$ and $t_5$, or between times $t_6$ and $t_7$; and the AP 1130 may provision resources for wireless communications between times $t_2$ and $t_3$ or between times $t_6$ and $t_7$ but may not provision resources for wireless communications between times $t_0$ and $t_2$ or between times $t_4$ and $t_6$.

In some implementations, each of the time sectors S1-S3 may be further subdivided into additional time sectors that can be allocated for communications with a respective subset of STAs (such as described with reference to FIGS. 7A-10). For example, each of the time sectors S1-S3 may represent a respective BSS communication interval (such as any of the BSS communication intervals 722 or 724 of FIG. 7A). In some aspects, each of the APs 1110, 1120, and 1130 may utilize r-TWT SPs, MU EDCA parameters, TIM information elements, or any combination thereof to allow its associated STAs to access the wireless medium during the time sector(s) to which the AP is mapped while preventing each of its associated STAs from accessing the wireless medium outside the time sector(s) to which the AP is mapped (such as described with reference to FIGS. 8A-8C).

In some implementations, each of the multi-AP coordination intervals 1142 and 1144 may include one or more "common" time sectors (not shown for simplicity) during which each of the APs 1110, 1120, and 1130 may provision resources for communications with its associated STAs. For example, one or more common time sectors may be scheduled between times $t_3$ and $t_4$ and between times $t_7$ and $t_8$. Each of the APs 1110, 1120, and 1130 may be mapped to each of the common time sectors. As such, any of the STAs 1101-1109 may access the wireless medium during any of the common time sectors.

Figure 12A:
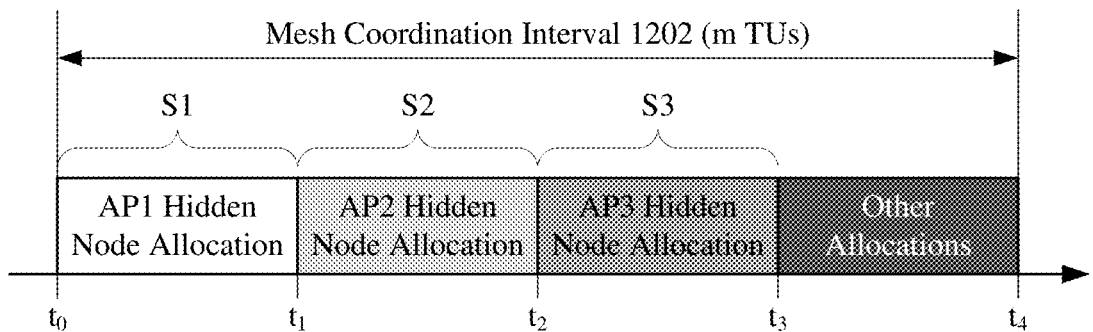
FIG. 12A shows a timing diagram depicting an example communication schedule associated with a mesh network, according to some implementations.

FIG. 12A shows a timing diagram 1200 depicting an example communication schedule associated with a mesh network, according to some implementations. More specifically, FIG. 12A shows a number of time sectors S1-S3 that can be provisioned by a central controller for communications with a number of APs (AP1-AP3) associated with the mesh network. In some implementations, each of the access points AP1-AP3 may be one example of any of the APs 1110, 1120, or 1130 of FIG. 11A. In the example of FIG. 12A, the mesh network is mapped to three time sectors S1-S3 that span at least a portion of a mesh coordination interval 1202. With reference for example to FIG. 11A, the mesh coordination interval 1202 may be one example of any of the multi-AP coordination intervals 1142 or 1144. However, in some other implementations, the mesh network may include fewer or more time sectors than those depicted in FIG. 12A.

In some aspects, the central controller may map each of the access points AP1-AP3 to one or more of the time sectors S1-S3 based on a network topology associated with the AP. More specifically, in the example of FIG. 12A, each AP may be mapped to one or more of the time sectors S1-S3 based on a presence of hidden nodes associated therewith. As described with reference to FIG. 9, an AP can reduce collisions among hidden nodes by mapping the hidden nodes to orthogonal time sectors. However, in a mesh network, communications to or from neighboring APs can interfere with a given AP's communications with one or more hidden nodes. With reference for example to FIG. 11A, the STAs 1101 and 1102 may be hidden nodes associated with the AP 1110, the STAs 1104 and 1105 may be hidden nodes associated with the AP 1120, and the STAs 1107 and 1108 may be hidden nodes associated with the AP 1130. However, communications by the STAs 1106, 1109, and 1103 may interfere with communications by the hidden nodes 1101, 1104, and 1107, respectively (such as during a common time sector).

Aspects of the present disclosure recognize that the central controller may further reduce collisions in the mesh network by mapping APs with hidden nodes to orthogonal time sectors. As such, each AP may serve its hidden nodes without interference from the coverage area of a neighboring AP. In the example of FIG. 12A, AP1 is mapped to the time sector S1, which occurs between times $t_0$ and $t_1$, AP2 is mapped to the time sector S2, which occurs between times $t_1$ and $t_2$, and AP3 is mapped to the time sector S3, which occurs between times $t_2$ and $t_3$. Thus, AP1 may serve its hidden nodes between times $t_0$ and $t_1$ without interference from AP2 or AP3 (or any of the STAs associated therewith), AP2 may serve its hidden nodes between times $t_1$ and $t_2$ without interference from AP1 or AP3 (or any of the STAs associated therewith), and AP3 may serve its hidden nodes between times $t_2$ and $t_3$ without interference from AP1 or AP2 (or any of the STAs associated therewith).

Figure 12B:
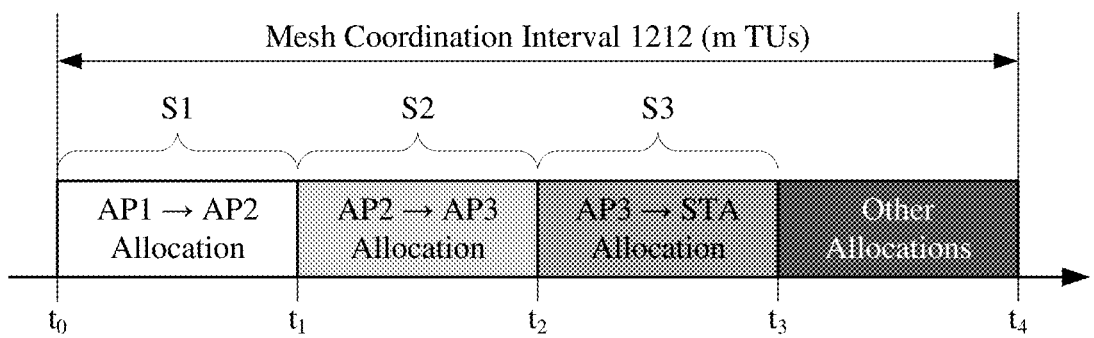
FIG. 12B shows a timing diagram depicting an example communication schedule associated with a mesh network, according to some implementations.

FIG. 12B shows a timing diagram 1210 depicting an example communication schedule associated with a mesh network, according to some implementations. More specifically, FIG. 12B shows a number of time sectors S1-S3 that can be provisioned by a central controller for communications with a number of APs (AP1-AP3) associated with the mesh network. In some implementations, each of the access points AP1-AP3 may be one example of any of the APs 1110, 1120, or 1130 of FIG. 11A. In the example of FIG. 12B, the mesh network is mapped to three time sectors S1-S3 that span at least a portion of a mesh coordination interval 1212. With reference for example to FIG. 11A, the mesh coordination interval 1212 may be one example of any of the multi-AP coordination intervals 1142 or 1144. However, in some other implementations, the mesh network may include fewer or more time sectors than those depicted in FIG. 12B.

In some aspects, the central controller may map each of the access points AP1-AP3 to one or more of the time sectors S1-S3 based on a QoS requirement associated with multi-hop communications with the AP. More specifically, in the example of FIG. 12B, each AP may be mapped to one or more of the time sectors S1-S3 based on its participation in a multi-hop communication. For example, some STAs may transmit or receive latency-sensitive communications with very low latency requirements. However, some end-to-end communications that traverse multiple hops in a mesh network may experience additional latency or delays at each hop. As described with reference to FIG. 11A, a multi-hop communication is any end-to-end communication (such as between a root AP and a STA) that passes through one or more range extenders in a mesh network. For example, a multi-hop communication may pass between the AP 1110 (as the root AP), the AP 1120 (as a first range extender), the AP 1130 (as a second range extender), and the STA 1108 of FIG. 11A.

Aspects of the present disclosure recognize that the central controller may reduce the end-to-end latency of multi-hop communications in the mesh network (or guarantee a QoS requirement) by mapping the APs involved in the hops to orthogonal time sectors. As such, the AP mapped to each time sector may transmit latency-sensitive communications without interference from the coverage area of a neighboring AP. In the example of FIG. 12B, AP1 is mapped to the time sector S1, which occurs between times $t_0$ and $t_1$, AP2 is mapped to the time sector S2, which occurs between times $t_1$ and $t_2$, and AP3 is mapped to the time sector S3, which occurs between times $t_2$ and $t_3$. Thus, AP1 may transmit latency-sensitive data to AP2, between times $t_0$ and $t_1$, without interference from AP2 or AP3 (or any of the STAs associated therewith), AP2 may transmit latency-sensitive data to AP3, between times $t_1$ and $t_2$, without interference from AP1 or AP3 (or any of the STAs associated therewith), and AP3 may transmit latency-sensitive data to a STA, between times $t_2$ and $t_3$, without interference from AP1 or AP2 (or any of the STAs associated therewith).

Figure 13A:
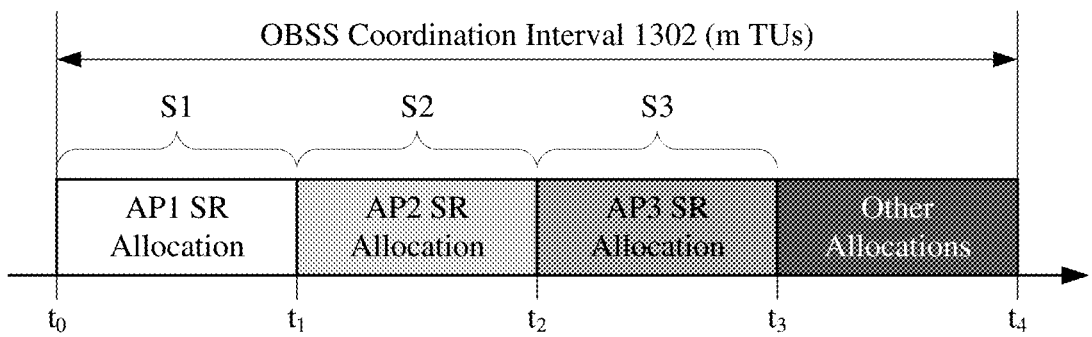
FIG. 13A shows a timing diagram depicting an example communication schedule associated with overlapping BSSs (OBSSs), according to some implementations.

FIG. 13A shows a timing diagram 1300 depicting an example communication schedule associated with OBSSs, according to some implementations. More specifically, FIG. 13A shows a number of time sectors S1-S3 that can be provisioned by a central controller for communications with a number of APs (AP1-AP3) associated with OBSSs. In some implementations, each of the access points AP1-AP3 may be one example of any of the APs 1110, 1120, or 1130 of FIG. 11A. In the example of FIG. 13A, the OBSSs are mapped to three time sectors S1-S3 that span at least a portion of an OBSS coordination interval 1402. With reference for example to FIG. 11A, the OBSS coordination interval 1402 may be one example of any of the multi-AP coordination intervals 1142 or 1144. However, in some other implementations, the OBSSs may include fewer or more time sectors than those depicted in FIG. 13A.

In some aspects, the central controller may map each of the access points AP1-AP3 to one or more of the time sectors S1-S3 based on a network topology associated with the AP. More specifically, in the example of FIG. 13A, each AP may be mapped to one or more of the time sectors S1-S3 based on a presence of STAs in overlapping coverage areas. For example, the IEEE 802.11 standard defines "spatial reuse" as a multi-AP coordination technique that allows APs in OBSSs to reduce the transmit power of communications with one or more STAs so as not to interfere with concurrent transmissions from neighboring BSSs. However, a STA that is located in an overlapping coverage area of two or more APs may not be able to reduce its transmit power to a level that does not interfere with an OBSS while still being able to reach its associated AP. With reference for example to FIG. 11A, the STA 1101 may not be able to communicate with its associated AP 1110 if it reduces its transmit power to levels that would not cause interference with the AP 1120.

Aspects of the present disclosure recognize that the central controller may improve spatial reuse (SR) in OBSSs by mapping APs associated with STAs in overlapping coverage areas to orthogonal time sectors. As such, each AP may serve such STAs without interference from the coverage area of a neighboring AP. In the example of FIG. 13A, AP1 is mapped to the time sector S1, which occurs between times $t_0$ and $t_1$, AP2 is mapped to the time sector S2, which occurs between times $t_1$ and $t_2$, and AP3 is mapped to the time sector S3, which occurs between times $t_2$ and $t_3$. Thus, AP1 may serve its associated STAs in overlapping coverage areas between times $t_0$ and $t_1$ without interference from AP2 or AP3 (or any of the STAs associated therewith), AP2 may serve its associated STAs in overlapping coverage areas between times $t_1$ and $t_2$ without interference from AP1 or AP3 (or any of the STAs associated therewith), and AP3 may serve its associated STAs in overlapping coverage areas between times $t_2$ and $t_3$ without interference from AP1 or AP2 (or any of the STAs associated therewith).

Figure 13B:
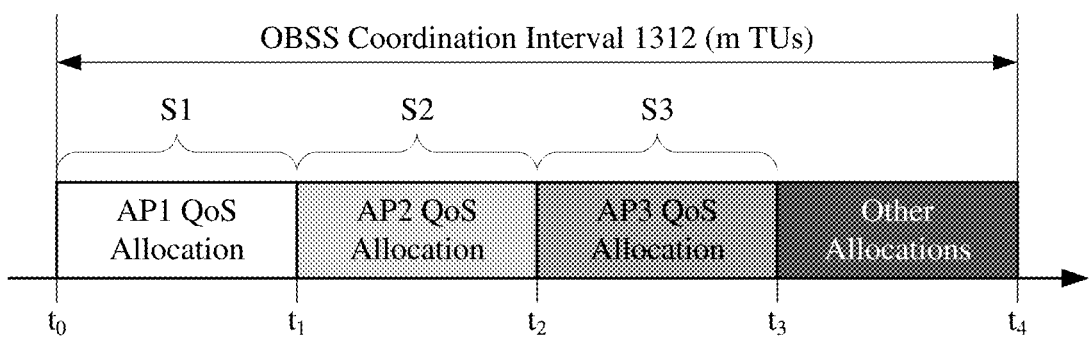
FIG. 13B shows a timing diagram depicting an example communication schedule associated with OBSSs, according to some implementations.

FIG. 13B shows a timing diagram 1310 depicting an example communication schedule associated with OBSSs, according to some implementations. More specifically, FIG. 13B shows a number of time sectors S1-S3 that can be provisioned by a central controller for communications with a number of APs (AP1-AP3) associated with the OBSSs. In some implementations, each of the access points AP1-AP3 may be one example of any of the APs 1110, 1120, or 1130 of FIG. 11A. In the example of FIG. 13B, the OBSSs are mapped to three time sectors S1-S3 that span at least a portion of an OBSS coordination interval 1312. With reference for example to FIG. 11A, the OBSS coordination interval 1312 may be one example of any of the multi-AP coordination intervals 1142 or 1144. However, in some other implementations, the OBSSs may include fewer or more time sectors than those depicted in FIG. 13B.

In some aspects, the central controller may map each of the access points AP1-AP3 to one or more of the time sectors S1-S3 based on a latency requirement of one or more STAs associated with the AP. More specifically, in the example of FIG. 13B, each AP may be mapped to one or more of the time sectors S1-S3 based on a presence of STAs with latency-sensitive data traffic. As described above, some STAs may be configured to transmit or receive latency-sensitive communications with very low latency requirements. However, wireless communication devices (including APs and STAs) in a given BSS may not be aware of latency-sensitive communications in an OBSS. As a result, wireless communications in the BSS may interfere or collide with latency-sensitive communications in the OBSS, which may add further delays or latency to such communications. With reference for example to FIG. 11A, communications between the AP 1120 and the STA 1104 may have very low latency requirements. However, communications between the AP 1130 and the STA 1109 my interfere with latency-sensitive communications between the AP 1120 and the STA 1104.

Aspects of the present disclosure recognize that the central controller may protect latency-sensitive traffic in OBSSs (or guarantee a QoS requirement) by mapping APs associated with latency-sensitive communications to orthogonal time sectors. As such, the AP mapped to each time sector may transmit latency-sensitive communications without interference from the coverage area of a neighboring AP. In the example of FIG. 13B, AP1 is mapped to the time sector S1, which occurs between times $t_0$ and $t_1$, AP2 is mapped to the time sector S2, which occurs between times $t_1$ and $t_2$, and AP3 is mapped to the time sector S3, which occurs between times $t_2$ and $t_3$. Thus, AP1 may exchange latency-sensitive traffic with its associated STAs, between times $t_0$ and $t_1$, without interference from AP2 or AP3 (or any of the STAs associated therewith), AP2 may exchange latency-sensitive traffic with its associated STAs, between times $t_1$ and $t_2$, without interference from AP1 or AP3 (or any of the STAs associated therewith), and AP3 may exchange latency-sensitive traffic with its associated STAs, between times $t_2$ and $t_3$, without interference from AP1 or AP2 (or any of the STAs associated therewith).

Figure 14:
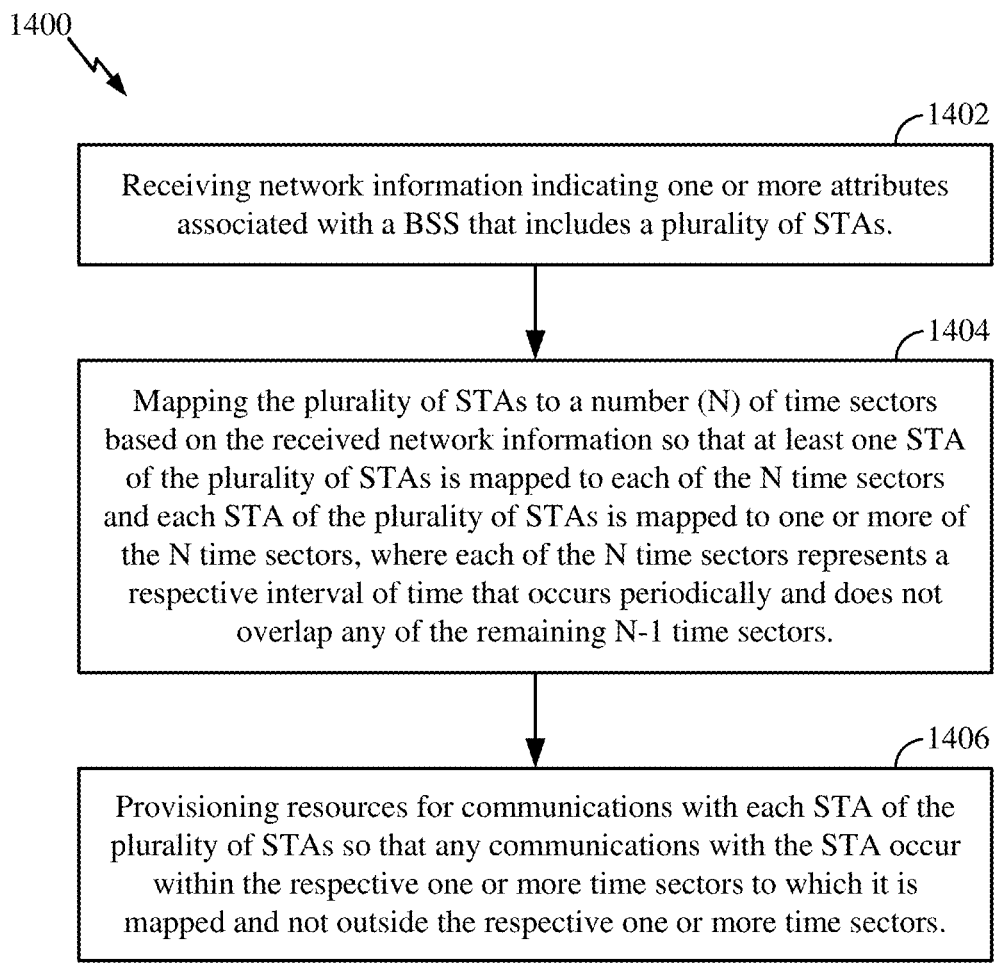
FIG. 14 shows a flowchart illustrating an example process for wireless communication that supports network time sectoring.

FIG. 14 shows a flowchart illustrating an example process 1400 for wireless communication that supports network time sectoring. In some implementations, the process 1400 may be performed by a wireless communication device operating as or within an AP, such as one of the APs 102, 502, or 620 described above with reference to FIGS. 1, 5A, and 6, respectively.

In some implementations, the process 1400 begins in block 1402 with receiving network information indicating one or more attributes associated with a BSS that includes a plurality of STAs. In block 1404, the process 1400 proceeds with mapping the plurality of STAs to a number (N) of time sectors based on the received network information so that at least one STA of the plurality of STAs is mapped to each of the N time sectors and each STA of the plurality of STAs is mapped to one or more of the N time sectors, where each of the N time sectors represents a respective interval of time that occurs periodically and does not overlap any of the remaining N−1 time sectors. In block 1406, the process 1400 proceeds with provisioning resources for communications with each STA of the plurality of STAs so that any communications with the STA occur within the respective one or more time sectors to which it is mapped and not outside the respective one or more time sectors.

In some implementations, the resources may include time, frequency, multi-user streams, memory, buffer, or processing resources. In some implementations, N may be based on the one or more attributes or a number (M) of STAs associated with the BSS. In some implementations, each of one or more of the N time sectors may be associated with a respective MU-MIMO group that consists of multiple STAs, of the plurality of STAs, mapped to the respective time sector. In some implementations, each STA of the plurality of STAs may be mapped to exactly one of the N time sectors.

In some implementations, the provisioning of the resources may include transmitting, within each of the N time sectors, a respective trigger frame that solicits concurrent UL transmissions from each of the STAs, of the plurality of STAs, mapped to the time sector. In some other implementations, the provisioning of resources may include provisioning, for each of the N time sectors, a respective r-TWT SP that overlaps the time sector and is associated with each of the STAs, of the plurality of STAs, mapped to the time sector. Still further, in some implementations, the provisioning of resources may include transmitting a beacon frame carrying a TIM that indicates an availability of DL data for each of the STAs, of the plurality of STAs, mapped to one or more time sectors of the N time sectors, where the one or more time sectors overlap a beacon interval associated with the beacon frame.

In some aspects, the one or more attributes may include a direction of communications with each STA of the plurality of STAs. In such aspects, the mapping of the plurality of STAs to the N time sectors may include mapping one or more first STAs of the plurality of STAs to a first time sector of the N time sectors based on the network information indicating that the direction of communications with each of the one or more first STAs is a DL direction; and mapping one or more second STAs of the plurality of STAs to a second time sector of the N time sectors based on the network information indicating that the direction of communications with each of the one or more second STAs is an UL direction.

In some aspects the one or more attributes may include a volume of data traffic communicated with each STA of the plurality of STAs. In such aspects, the mapping of the plurality of STAs to the N time sectors may include mapping one or more first STAs of the plurality of STAs to a first time sector of the N time sectors based on the network information indicating that the volume of data traffic communicated with each of the one or more first STAs is greater than a threshold amount; and mapping one or more second STAs of the plurality of STAs to a second time sector of the N time sectors based on the network information indicating that the volume of data traffic communicated with each of the one or more second STAs is less than the threshold amount.

In some aspects, the one or more attributes may include one or more capabilities supported by each STA of the plurality of STAs. In such aspects, the mapping of the plurality of STAs to the N time sectors may include mapping one or more STAs of the plurality of STAs to a first time sector of the N time sectors based on the network information indicating that each of the one or more STAs supports the same one or more capabilities.

In some aspects, the one or more attributes may include one or more PHY modes supported by each STA of the plurality of STAs. In such aspects, the mapping of the plurality of STAs to the N time sectors may include mapping one or more STAs of the plurality of STAs to a first time sector of the N time sectors based on the network information indicating that each of the one or more STAs supports the same one or more PHY modes.

In some aspects, the one or more attributes may include a QoS requirement associated with the communications with any STA of the plurality of STAs. In such aspects, the mapping of the plurality of STAs to the N time sectors may include mapping a first STA of the plurality of STAs to a first time sector of the N time sectors based on the network information indicating that the QoS requirement associated with the communications with the first STA is greater than a threshold QoS requirement.

In some aspects, the one or more attributes may include one or more network topology characteristics associated with each STA of the plurality of STAs. In such aspects, the mapping of the plurality of STAs to the N time sectors may include mapping one or more STAs of the plurality of STAs to a first time sector of the N time sectors based on the network information indicating that the one or more network topology characteristics associated with each of the one or more STAs are within a threshold range. In some implementations, the one or more network topology characteristics may include an orientation, location, or path loss.

In some aspects, the one or more attributes may include one or more channel characteristics associated with each STA of the plurality of STAs. In such aspects, the mapping of the plurality of STAs to the N time sectors may include mapping one or more STAs of the plurality of STAs to a first time sector of the N time sectors based on the network information indicating that the one or more channel characteristics associated with each of the one or more STAs are within a threshold range. In some implementations, the one or more channel characteristics may include a channel correlation metric, Doppler shift, or delay spread.

In some aspects, the one or more attributes may include one or more SLA requirements associated with each STA of the plurality of STAs. In such aspects, the mapping of the plurality of STAs to the N time sectors may include mapping one or more STAs of the plurality of STAs to one or more time sectors of the N time sectors based on the network information indicating that the one or more SLA requirements associated with each of the one or more STAs are within a threshold range. In some implementations, a frequency with which each of the one or more time sectors periodically occurs may be based on the one or more SLA requirements associated with the one or more STAs.

Figure 15:
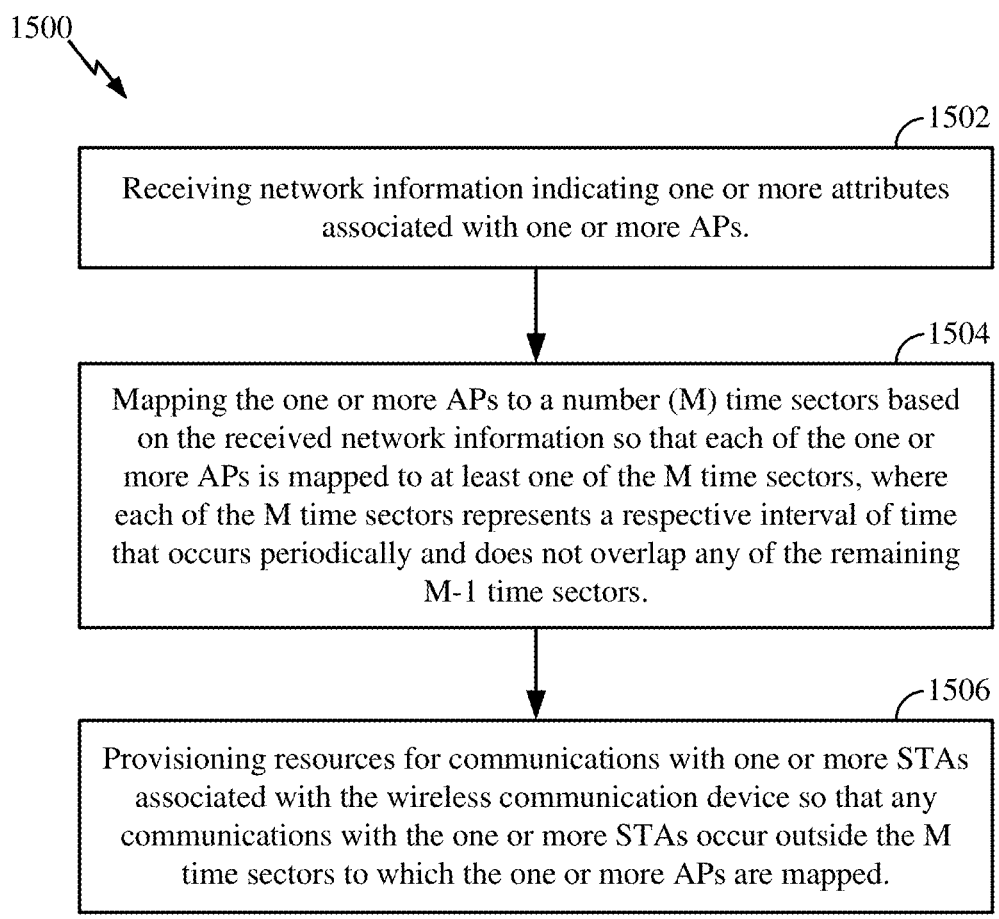
FIG. 15 shows a flowchart illustrating an example process for wireless communication that supports network time sectoring.

FIG. 15 shows a flowchart illustrating an example process 1500 for wireless communication that supports network time sectoring. In some implementations, the process 1500 may be performed by a wireless communication device operating as or within an AP, such as one of the APs 102, 502, or 620 described above with reference to FIGS. 1, 5A, and 6, respectively.

In some implementations, the process 1500 begins in block 1502 with receiving network information indicating one or more attributes associated with one or more APs. In block 1504, the process 1500 proceeds with mapping the one or more APs to a number (M) time sectors based on the received network information so that each of the one or more APs is mapped to at least one of the M time sectors, where each of the M time sectors represents a respective interval of time that occurs periodically and does not overlap any of the remaining M−1 time sectors. In block 1506, the process 1500 proceeds with provisioning resources for communications with one or more STAs associated with the wireless communication device so that any communications with the one or more STAs occur outside the M time sectors to which the one or more APs are mapped. In some implementations, the resources may include time, frequency, memory, or processing resources. In some aspects, the one or more attributes may include the mapping of the one or more APs to the M time sectors.

In some aspects, the one or more attributes may include a latency requirement associated with communications between the one or more APs and any STAs associated with the one or more APs. In such aspects, the mapping of the one or more APs to the M time sectors may include mapping a first AP of the one or more APs to a first time sector of the M time sectors based on the network information indicating that the latency requirement associated with communications between the first AP and a first STA associated with the first AP is lower than a threshold latency requirement, where the first time sector is associated with communications between the first AP and the first STA.

In some aspects, the one or more attributes include a QoS requirement associated with multi-hop communications with any of the one or more APs. In such aspects, the mapping of the one or more APs to the M time sectors may include mapping a first AP of the one or more APs to a first time sector of the M time sectors based on the network information indicating that the QoS requirement associated with multi-hop communications with the first AP is greater than a threshold QoS requirement. In some implementations, the wireless communication device may further exchange, with the first AP, data associated with the multi-hop communications within the first time sector.

In some aspects, the one or more attributes include a network topology associated with the one or more APs. In some implementations, the network topology may indicate whether hidden nodes are associated with any of the one or more APs. In such implementations, the mapping of the one or more APs to the M time sectors may include mapping a first AP of the one or more APs to a first time sector of the M time sectors based on the network information indicating that hidden nodes are associated with the first AP, where the first time sector is associated with communications between the first AP and one or more of the hidden nodes associated with the first AP.

In some other implementations, the network topology may indicate whether any STAs associated with the one or more APs are located within a coverage area associated with the wireless communication device. In such implementations, the mapping of the one or more APs to the M time sectors may include mapping a first AP of the one or more APs to a first time sector of the M time sectors based on the network information indicating that one or more STAs associated with the first AP are located within the coverage area associated with the wireless communication device, where the first time sector is associated with communications between the first AP and the one or more STAs associated with the first AP.

Figure 16:
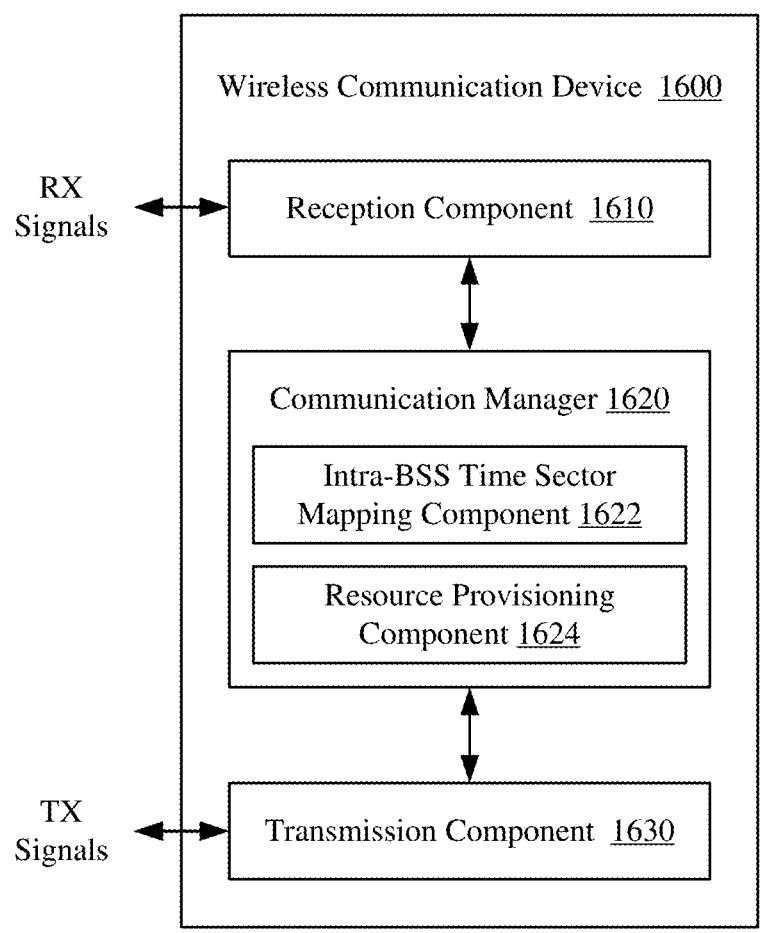
FIG. 16 shows a block diagram of an example wireless communication device according to some implementations.

FIG. 16 shows a block diagram of an example wireless communication device 1600 according to some implementations. In some implementations, the wireless communication device 1600 is configured to perform the process 1400 described above with reference to FIG. 14. The wireless communication device 1600 can be an example implementation of the wireless communication device 400 described above with reference to FIG. 4. For example, the wireless communication device 1600 can be a chip, SoC, chipset, package or device that includes at least one processor and at least one modem (for example, a Wi-Fi (IEEE 802.11) modem or a cellular modem).

The wireless communication device 1600 includes a reception component 1610, a communication manager 1620, and a transmission component 1630. The communication manager 1620 further includes an intra-BSS time sector mapping component 1622 and a resource provisioning component 1624. Portions of one or more of the components 1622 and 1624 may be implemented at least in part in hardware or firmware. In some implementations, at least some of the components 1622 or 1624 are implemented at least in part as software stored in a memory (such as the memory 408). For example, portions of one or more of the components 1622 and 1624 can be implemented as non-transitory instructions (or "code") executable by a processor (such as the processor 406) to perform the functions or operations of the respective component.

The reception component 1610 is configured to receive RX signals, over a wireless channel, from one or more other wireless communication devices. In some implementations, the reception component 1610 may receive network information indicating one or more attributes associated with a BSS that includes a plurality of STAs. The communication manager 1620 is configured to control or manage communications with one or more other wireless communication devices. In some implementations, the intra-BSS time sector mapping component 1622 may map the plurality of STAs to a number (N) of time sectors based on the received network information so that at least one STA of the plurality of STAs is mapped to each of the N time sectors and each STA of the plurality of STAs is mapped to one or more of the N time sectors, where each of the N time sectors represents a respective interval of time that occurs periodically and does not overlap any of the remaining N−1 time sectors; and the resource provisioning component 1624 may provision resources for communications with each STA of the plurality of STAs so that any communications with the STA occur within the respective one or more time sectors to which it is mapped and not outside the respective one or more time sectors. The transmission component 1630 is configured to transmit TX signals, over a wireless channel, to one or more other wireless communication devices.

Figure 17:
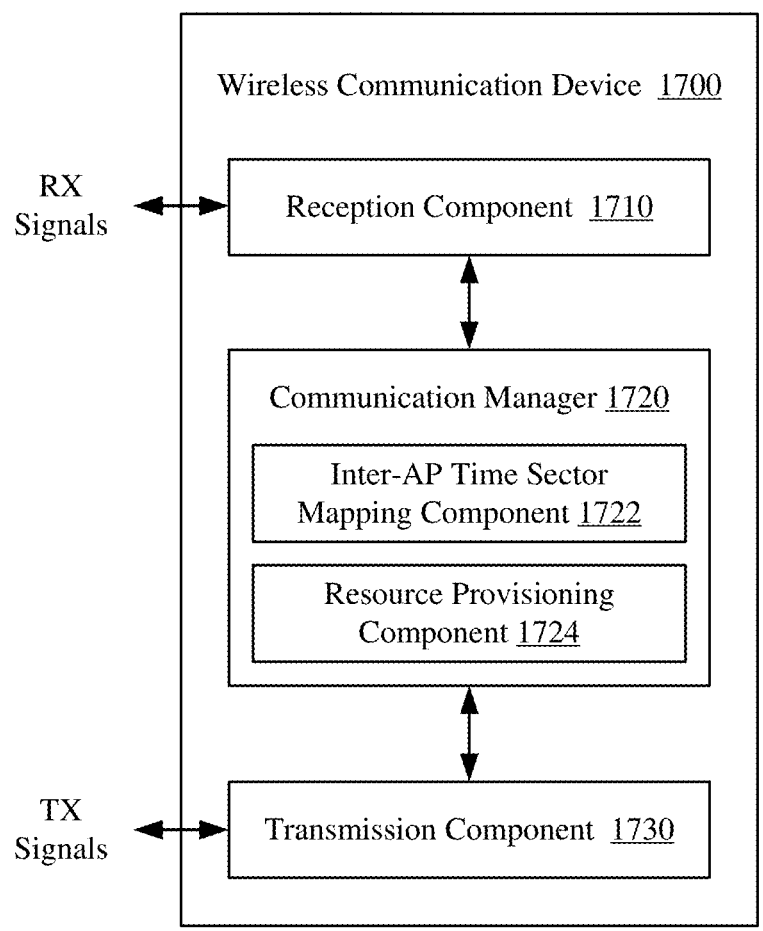
FIG. 17 shows a block diagram of an example wireless communication device according to some implementations.

FIG. 17 shows a block diagram of an example wireless communication device 1700 according to some implementations. In some implementations, the wireless communication device 1700 is configured to perform the process 1500 described above with reference to FIG. 15. The wireless communication device 1700 can be an example implementation of the wireless communication device 400 described above with reference to FIG. 4. For example, the wireless communication device 1700 can be a chip, SoC, chipset, package or device that includes at least one processor and at least one modem (for example, a Wi-Fi (IEEE 802.11) modem or a cellular modem).

The wireless communication device 1700 includes a reception component 1710, a communication manager 1720, and a transmission component 1730. The communication manager 1720 further includes an inter-AP time sector mapping component 1722 and a resource provisioning component 1724. Portions of one or more of the components 1722 and 1724 may be implemented at least in part in hardware or firmware. In some implementations, at least some of the components 1722 or 1724 are implemented at least in part as software stored in a memory (such as the memory 408). For example, portions of one or more of the components 1722 and 1724 can be implemented as non-transitory instructions (or "code") executable by a processor (such as the processor 406) to perform the functions or operations of the respective component.

The reception component 1710 is configured to receive RX signals, over a wireless channel, from one or more other wireless communication devices. In some implementations, the reception component 1710 may receive network information indicating one or more attributes associated with one or more APs. The communication manager 1720 is configured to control or manage communications with one or more other wireless communication devices. In some implementations, the inter-AP time sector mapping component 1722 may map the one or more APs to a number (M) time sectors based on the received network information so that each of the one or more APs is mapped to at least one of the M time sectors, where each of the M time sectors represents a respective interval of time that occurs periodically and does not overlap any of the remaining M−1 time sectors; and the resource provisioning component 1724 may provision resources for communications with one or more STAs associated with the wireless communication device so that any communications with the one or more STAs occur outside the M time sectors to which the one or more APs are mapped. The transmission component 1730 is configured to transmit TX signals, over a wireless channel, to one or more other wireless communication devices.

Implementation examples are described in the following numbered clauses:

1. A method for wireless communication by a wireless communication device, including:

receiving network information indicating one or more attributes associated with a basic service set (BSS) that includes a plurality of wireless stations (STAs);

mapping the plurality of STAs to a number (N) of time sectors based on the received network information so that at least one STA of the plurality of STAs is mapped to each of the N time sectors and each STA of the plurality of STAs is mapped to one or more of the N time sectors, each of the N time sectors representing a respective interval of time that occurs periodically and does not overlap any of the remaining N−1 time sectors; and provisioning resources for communications with each STA of the plurality of STAs so that any communications with the STA occur within the respective one or more time sectors to which it is mapped and not outside the respective one or more time sectors.

2. The method of clause 1, where the resources include time, frequency, multi-user streams, memory, buffer, or processing resources.

3. The method of any of clauses 1 or 2, where N is based on the one or more attributes or a number (M) of STAs associated with the BSS.

4. The method of any of clauses 1-3, where each of one or more of the N time sectors is associated with a respective multi-user (MU) multiple-input multiple-output (MIMO) group that consists of multiple STAs, of the plurality of STAs, mapped to the respective time sector.

5. The method any of clauses 1-4, where the provisioning of the resources includes:

transmitting, within each of the N time sectors, a respective trigger frame that solicits concurrent uplink (UL) transmissions from each of the STAs, of the plurality of STAs, mapped to the time sector.

6. The method of any of clauses 1-5, where the provisioning of the resources includes:

provisioning, for each of the N time sectors, a respective restricted target-wake-time (r-TWT) service period (SP) that overlaps the time sector and is associated with each of the STAs, of the plurality of STAs, mapped to the time sector.

7. The method of any of clauses 1-6, where the provisioning of the resources includes:

transmitting a beacon frame carrying a traffic indication map (TIM) that indicates an availability of downlink (DL) data for each of the STAs, of the plurality of STAs, mapped to one or more time sectors of the N time sectors, the one or more time sectors overlapping a beacon interval associated with the beacon frame.

8. The method of any of clauses 1-7, where the one or more attributes include a direction of communications with each STA of the plurality of STAs, the mapping of the plurality of STAs to the N time sectors including:

mapping one or more first STAs of the plurality of STAs to a first time sector of the N time sectors based on the network information indicating that the direction of communications with each of the one or more first STAs is a DL direction; and mapping one or more second STAs of the plurality of STAs to a second time sector of the N time sectors based on the network information indicating that the direction of communications with each of the one or more second STAs is an UL direction.

9. The method of any of clauses 1-8, where the one or more attributes include a volume of data traffic communicated with each STA of the plurality of STAs, the mapping of the plurality of STAs to the N time sectors including:

mapping one or more first STAs of the plurality of STAs to a first time sector of the N time sectors based on the network information indicating that the volume of data traffic communicated with each of the one or more first STAs is greater than a threshold amount; and mapping one or more second STAs of the plurality of STAs to a second time sector of the N time sectors based on the network information indicating that the volume of data traffic communicated with each of the one or more second STAs is less than the threshold amount.

10. The method of any of clauses 1-9, where the one or more attributes include one or more capabilities supported by each STA of the plurality of STAs, the mapping of the plurality of STAs to the N time sectors including:

mapping one or more STAs of the plurality of STAs to a first time sector of the N time sectors based on the network information indicating that each of the one or more STAs supports the same one or more capabilities.

11. The method of any of clauses 1-10, where the one or more attributes include one or more physical layer (PHY) modes supported by each STA of the plurality of STAs, the mapping of the plurality of STAs to the N time sectors including:

mapping one or more STAs of the plurality of STAs to a first time sector of the N time sectors based on the network information indicating that each of the one or more STAs supports the same one or more PHY modes.

12. The method of any of clauses 1-11, where the one or more attributes include a quality of service (QoS) requirement associated with the communications with any STA of the plurality of STAs, the mapping of the plurality of STAs to the N time sectors including:

mapping a first STA of the plurality of STAs to a first time sector of the N time sectors based on the network information indicating that the QoS requirement associated with the communications with the first STA is greater than a threshold QoS requirement.

13. The method of any of clauses 1-12, where the one or more attributes include one or more network topology characteristics associated with each STA of the plurality of STAs, the mapping of the plurality of STAs to the N time sectors including:

mapping one or more STAs of the plurality of STAs to a first time sector of the N time sectors based on the network information indicating that the one or more network topology characteristics associated with each of the one or more STAs are within a threshold range.

14. The method of any of clauses 1-13, where the one or more network topology characteristics include an orientation, location, or path loss.

15. The method of any of clauses 1-14, where the one or more attributes include one or more channel characteristics associated with each STA of the plurality of STAs, the mapping of the plurality of STAs to the N time sectors including:

mapping one or more STAs of the plurality of STAs to a first time sector of the N time sectors based on the network information indicating that the one or more channel characteristics associated with each of the one or more STAs are within a threshold range.

16. The method of any of clauses 1-15, where the one or more channel characteristics include a channel correlation metric, Doppler shift, or delay spread.

17. The method of any of clauses 1-16, where the one or more attributes include one or more service-level agreement (SLA) requirements associated with each STA of the plurality of STAs, the mapping of the plurality of STAs to the N time sectors including:

mapping one or more STAs of the plurality of STAs to one or more time sectors of the N time sectors based on the network information indicating that the one or more SLA requirements associated with each of the one or more STAs are within a threshold range.

18. The method of any of clauses 1-17, where a frequency with which each of the one or more time sectors periodically occurs is based on the one or more SLA requirements associated with the one or more STAs.

19. The method of any of clauses 1-18, where each STA of the plurality of STAs is mapped to exactly one of the N time sectors.

20. A wireless communication device including:
at least one processor; and
at least one memory communicatively coupled with the at least one processor and storing processor-readable code that, when executed by the at least one processor, is configured to perform the method of any one or more of clauses 1-19.

21. A method for wireless communication by a wireless communication device, including:
receiving network information indicating one or more attributes associated with one or more access points (APs);
mapping the one or more APs to a number (M) time sectors based on the received network information so that each of the one or more APs is mapped to at least one of the M time sectors, each of the M time sectors representing a respective interval of time that occurs periodically and does not overlap any of the remaining M−1 time sectors; and
provisioning resources for communications with one or more wireless stations (STAs) associated with the wireless communication device so that any communications with the one or more STAs occur outside the M time sectors to which the one or more APs are mapped.

22. The method of clause 21, where the resources include time, frequency, memory, or processing resources.

23. The method of any of clauses 21 or 22, where the one or more attributes include the mapping of the one or more APs to the M time sectors.

24. The method of any of clauses 21-23, where the one or more attributes include a latency requirement associated with communications between the one or more APs and any STAs associated with the one or more APs, the mapping of the one or more APs to the M time sectors including:

mapping a first AP of the one or more APs to a first time sector of the M time sectors based on the network information indicating that the latency requirement associated with communications between the first AP and a first STA associated with the first AP is lower than a threshold latency requirement, the first time sector being associated with communications between the first AP and the first STA.

25. The method of any of clauses 21-24, where the one or more attributes include a quality of service (QoS) requirement associated with multi-hop communications with any of the one or more APs, the mapping of the one or more APs to the M time sectors including:

mapping a first AP of the one or more APs to a first time sector of the M time sectors based on the network information indicating that the QoS requirement associated with multi-hop communications with the first AP is greater than a threshold QoS requirement.

26. The method of any of clauses 21-25, further including:
exchanging, with the first AP, data associated with the multi-hop communications within the first time sector.

27. The method of any of clauses 21-26, where the one or more attributes include a network topology associated with the one or more APs.

28. The method of any of clauses 21-27, where the network topology indicates whether hidden nodes are associated with any of the one or more APs, the mapping of the one or more APs to the M time sectors including:

mapping a first AP of the one or more APs to a first time sector of the M time sectors based on the network information indicating that hidden nodes are associated with the first AP, the first time sector being associated with communications between the first AP and one or more of the hidden nodes associated with the first AP.

29. The method of any of clauses 21-28, where the network topology indicates whether any STAs associated with the one or more APs are located within a coverage area associated with the wireless communication device, the mapping of the one or more APs to the M time sectors including:

mapping a first AP of the one or more APs to a first time sector of the M time sectors based on the network information indicating that one or more STAs associated with the first AP are located within the coverage area associated with the wireless communication device, the first time sector being associated with communications between the first AP and the one or more STAs associated with the first AP.

30. A wireless communication device including:
at least one processor; and
at least one memory communicatively coupled with the at least one processor and storing processor-readable code that, when executed by the at least one processor, is configured to perform the method of any one or more of clauses 21-29.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c. As used herein, "based on" is intended to be interpreted in the inclusive sense, unless otherwise explicitly indicated. For example, "based on" may be used interchangeably with "based at least in part on," unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions, or information.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication by a wireless communication device, comprising:
  receiving network information indicating one or more attributes associated with a basic service set (BSS) that includes a plurality of wireless stations (STAs);
  mapping the plurality of STAs to a number (N) of time sectors based on the received network information so that at least one STA of the plurality of STAs is mapped to each of the N time sectors and each STA of the plurality of STAs is mapped to one or more of the N time sectors, each of the N time sectors representing a respective interval of time that occurs periodically and does not overlap any of a remaining N−1 time sectors; and
  provisioning resources for communications with each STA of the plurality of STAs so that any communications with each STA occur within the respective one or more time sectors to which it is mapped and not outside the respective one or more time sectors.

2. The method of claim 1, wherein the resources include time, frequency, multi-user streams, memory, buffer, or processing resources.

3. The method of claim 1, wherein N is based on the one or more attributes or a number (M) of STAs associated with the BSS.

4. The method of claim 1, wherein each of one or more of the N time sectors is associated with a respective multi-user (MU) multiple-input multiple-output (MIMO) group that consists of multiple STAs, of the plurality of STAs, mapped to a respective time sector.

5. The method of claim 1, wherein the provisioning of the resources comprises:
  transmitting, within each of the N time sectors, a respective trigger frame that solicits concurrent uplink (UL) transmissions from each of the STAs, of the plurality of STAs, mapped to a respective time sector.

6. The method of claim 1, wherein the provisioning of the resources comprises:
  provisioning, for each of the N time sectors, a respective restricted target-wake-time (r-TWT) service period (SP) that overlaps a respective time sector of the N time sectors and is associated with each of the STAs, of the plurality of STAs, mapped to the respective time sector.

7. The method of claim 1, wherein the provisioning of the resources comprises:
  transmitting a beacon frame carrying a traffic indication map (TIM) that indicates an availability of downlink (DL) data for each STAs, of the plurality of STAs, mapped to one or more time sectors of the N time sectors, the one or more time sectors overlapping a beacon interval associated with the beacon frame.

8. The method of claim 1, wherein the one or more attributes include a direction of communications with each STA of the plurality of STAs, the mapping of the plurality of STAs to the N time sectors comprising:
  mapping one or more first STAs of the plurality of STAs to a first time sector of the N time sectors based on the network information indicating that the direction of communications with each of the one or more first STAs is a DL direction; and
  mapping one or more second STAs of the plurality of STAs to a second time sector of the N time sectors based on the network information indicating that the direction of communications with each of the one or more second STAs is an UL direction.

9. The method of claim 1, wherein the one or more attributes include a volume of data traffic communicated with each STA of the plurality of STAs, the mapping of the plurality of STAs to the N time sectors comprising:
  mapping one or more first STAs of the plurality of STAs to a first time sector of the N time sectors based on the network information indicating that the volume of data traffic communicated with each of the one or more first STAs is greater than a threshold amount; and
  mapping one or more second STAs of the plurality of STAs to a second time sector of the N time sectors based on the network information indicating that the volume of data traffic communicated with each of the one or more second STAs is less than the threshold amount.

10. The method of claim 1, wherein the one or more attributes include one or more capabilities supported by each STA of the plurality of STAs, the mapping of the plurality of STAs to the N time sectors comprising:

mapping one or more STAs of the plurality of STAs to a first time sector of the N time sectors based on the network information indicating that each of the one or more STAs supports a same one or more capabilities.

11. The method of claim 1, wherein the one or more attributes include one or more physical layer (PHY) modes supported by each STA of the plurality of STAs, the mapping of the plurality of STAs to the N time sectors comprising:

mapping one or more STAs of the plurality of STAs to a first time sector of the N time sectors based on the network information indicating that each of the one or more STAs supports a same one or more PHY modes.

12. The method of claim 1, wherein the one or more attributes include a quality of service (QOS) requirement associated with the communications with any STA of the plurality of STAs, the mapping of the plurality of STAs to the N time sectors comprising:

mapping a first STA of the plurality of STAs to a first time sector of the N time sectors based on the network information indicating that the QoS requirement associated with the communications with the first STA is greater than a threshold QoS requirement.

13. The method of claim 1, wherein the one or more attributes include one or more network topology characteristics associated with each STA of the plurality of STAs, the mapping of the plurality of STAs to the N time sectors comprising:

mapping one or more STAs of the plurality of STAs to a first time sector of the N time sectors based on the network information indicating that the one or more network topology characteristics associated with each of the one or more STAs are within a threshold range.

14. The method of claim 13, wherein the one or more network topology characteristics include an orientation, location, or path loss.

15. The method of claim 1, wherein the one or more attributes include one or more channel characteristics associated with each STA of the plurality of STAs, the mapping of the plurality of STAs to the N time sectors comprising:

mapping one or more STAs of the plurality of STAs to a first time sector of the N time sectors based on the network information indicating that the one or more channel characteristics associated with each of the one or more STAs are within a threshold range.

16. The method of claim 15, wherein the one or more channel characteristics include a channel correlation metric, Doppler shift, or delay spread.

17. The method of claim 1, wherein the one or more attributes include one or more service-level agreement (SLA) requirements associated with each STA of the plurality of STAs, the mapping of the plurality of STAs to the N time sectors comprising:

mapping one or more STAs of the plurality of STAs to one or more time sectors of the N time sectors based on the network information indicating that the one or more SLA requirements associated with each of the one or more STAs are within a threshold range.

18. The method of claim 17, wherein a frequency with which each of the one or more time sectors periodically occurs is based on the one or more SLA requirements associated with the one or more STAs.

19. The method of claim 1, wherein each STA of the plurality of STAs is mapped to exactly one of the N time sectors.

20. A wireless communication device comprising:
at least one processor; and
at least one memory communicatively coupled with the at least one processor and storing processor-readable code that, when executed by the at least one processor, is configured to:

receive network information indicating one or more attributes associated with a basic service set (BSS) that includes a plurality of wireless stations (STAs);

map the plurality of STAs to a number (N) of time sectors based on the received network information so that at least one STA of the plurality of STAs is mapped to each of the N time sectors and each STA of the plurality of STAs is mapped to one or more of the N time sectors, each of the N time sectors representing a respective interval of time that occurs periodically and does not overlap any of a remaining N−1 time sectors; and provision resources for communications with each STA of the plurality of STAs so that any communications with each STA occur within the respective one or more time sectors to which it is mapped and not outside the respective one or more time sectors.

21. A method for wireless communication by a wireless communication device, comprising:

receiving network information indicating one or more attributes associated with one or more access points (APs), wherein the one or more access points are associated with an interval, and wherein the interval is divided into a number (M) of time sectors;

mapping the one or more APs to the M time sectors of the interval based on the received network information so that each of the one or more APs is mapped to at least one of the M time sectors, each of the M time sectors representing a respective interval of time that occurs periodically and does not overlap any of a remaining M−1 time sectors; and provisioning resources for communications with one or more wireless stations (STAs) associated with the wireless communication device so that any communications with the one or more STAs occur outside the M time sectors to which the one or more APs are mapped.

22. The method of claim 21, wherein the resources include time, frequency, memory, or processing resources.

23. The method of claim 21, wherein the one or more attributes include the mapping of the one or more APs to the M time sectors.

24. The method of claim 21, wherein the one or more attributes include a latency requirement associated with communications between the one or more APs and any STAs associated with the one or more APs, the mapping of the one or more APs to the M time sectors comprising:

mapping a first AP of the one or more APs to a first time sector of the M time sectors based on the network information indicating that the latency requirement associated with communications between the first AP and a first STA associated with the first AP is lower than a threshold latency requirement, the first time sector being associated with communications between the first AP and the first STA.

25. The method of claim 21, wherein the one or more attributes include a quality of service (QOS) requirement associated with multi-hop communications with any of the one or more APs, the mapping of the one or more APs to the M time sectors comprising:

mapping a first AP of the one or more APs to a first time sector of the M time sectors based on the network information indicating that the QoS requirement associated with multi-hop communications with the first AP is greater than a threshold QOS requirement.

26. The method of claim 25, further comprising:
exchanging, with the first AP, data associated with the multi-hop communications within the first time sector.

27. The method of claim 21, wherein the one or more attributes include a network topology associated with the one or more APs.

28. The method of claim 27, wherein the network topology indicates whether hidden nodes are associated with any of the one or more APs, the mapping of the one or more APs to the M time sectors comprising:
mapping a first AP of the one or more APs to a first time sector of the M time sectors based on the network information indicating that hidden nodes are associated with the first AP, the first time sector being associated with communications between the first AP and one or more of the hidden nodes associated with the first AP.

29. The method of claim 27, wherein the network topology indicates whether any STAs associated with the one or more APs are located within a coverage area associated with the wireless communication device, the mapping of the one or more APs to the M time sectors comprising:
mapping a first AP of the one or more APs to a first time sector of the M time sectors based on the network information indicating that one or more STAs associated with the first AP are located within the coverage area associated with the wireless communication device, the first time sector being associated with communications between the first AP and the one or more STAs associated with the first AP.

30. A wireless communication device comprising:
at least one processor; and
at least one memory communicatively coupled with the at least one processor and storing processor-readable code that, when executed by the at least one processor, is configured to:
receive network information indicating one or more attributes associated with one or more access points (APs), wherein the one or more access points are associated with an interval, and wherein the interval is divided into a number (M) of time sectors;
map the one or more APs to the M time sectors of the interval based on the received network information so that each of the one or more APs is mapped to at least one of the M time sectors, each of the M time sectors representing a respective interval of time that occurs periodically and does not overlap any of a remaining M−1 time sectors; and
provision resources for communications with one or more wireless stations (STAs) associated with the wireless communication device so that any communications with the one or more STAs occur outside the M time sectors to which the one or more APs are mapped.

* * * * *